US009577894B1

(12) United States Patent
Hadar et al.

(10) Patent No.: US 9,577,894 B1
(45) Date of Patent: Feb. 21, 2017

(54) SYSTEM AND METHOD FOR CODIFICATION AND REPRESENTATION OF SITUATIONAL AND COMPLEX APPLICATION BEHAVIORAL PATTERNS

(71) Applicants: Eitan Hadar, Nesher (IL); Irit Hadar, Nesher (IL)

(72) Inventors: Eitan Hadar, Nesher (IL); Irit Hadar, Nesher (IL)

(73) Assignee: CA, Inc., New York, NY (US)

( * ) Notice: Subject to any disclaimer, the term of this patent is extended or adjusted under 35 U.S.C. 154(b) by 287 days.

(21) Appl. No.: 13/832,751

(22) Filed: Mar. 15, 2013

(51) Int. Cl.
*H04L 12/26* (2006.01)
*G06F 9/54* (2006.01)
*G06F 15/173* (2006.01)

(52) U.S. Cl.
CPC ............... *H04L 43/04* (2013.01); *G06F 9/547* (2013.01)

(58) Field of Classification Search
CPC ............ G06F 9/547; G06F 21/00; G06F 8/30; G06F 15/0283; H04L 67/16; H04L 43/04
USPC .............. 709/223–229; 726/10, 30; 455/406; 705/32; 707/693
See application file for complete search history.

(56) References Cited

U.S. PATENT DOCUMENTS

| | | | |
|---|---|---|---|
| 7,020,628 B2 * | 3/2006 | Peterson et al. ................ | 705/32 |
| 7,117,194 B2 * | 10/2006 | Costantino et al. | |
| 7,809,351 B1 * | 10/2010 | Panda et al. .................. | 455/406 |
| 8,332,524 B2 * | 12/2012 | Garfinkle ................ | H04L 67/16 709/223 |
| 2010/0064357 A1 * | 3/2010 | Baird et al. ....................... | 726/6 |
| 2011/0047608 A1 * | 2/2011 | Levenberg ........................ | 726/7 |
| 2011/0145933 A1 * | 6/2011 | Gambhir et al. ............... | 726/30 |

* cited by examiner

*Primary Examiner* — Emmanuel L Moise
*Assistant Examiner* — Zi Ye
(74) *Attorney, Agent, or Firm* — Baker Botts L.L.P.

(57) ABSTRACT

Systems and methods may receive process data corresponding to respective activated processes performed in a network. The process data may include identity data and activity data. The identity data may identify an identity that activated the respective activated processes. The activity data may identify a function performed by the respective activated processes. The systems and methods may determine an identity token that corresponds to the identity data. The systems and methods may determine an activity token that corresponds to the activity data. The systems and methods may determine log data for the respective activated processes. The log data may include the identity token and the activity token for each of the respective activated processes. The systems and methods may generate a map based on the log data.

21 Claims, 9 Drawing Sheets

SYSTEM AND METHOD FOR CODIFICATION AND REPRESENTATION OF SITUATIONAL AND COMPLEX APPLICATION BEHAVIORAL PATTERNS

BACKGROUND

The present disclosure relates to cloud computing and application performance management and, more specifically, to a system and method for codification and representation of situational and complex application behavioral patterns.

A situational application is "good enough" software created for a narrow group of users with a unique set of needs. Situational applications typically (but not always) have a short life span and are often created within the community in which such applications are used. In many cases, users themselves may create a situational application, which such users ultimately use themselves. Situational applications are developed fast, easy to use, uncomplicated, and serve a unique set of requirements. Situational applications have a narrow focus on a specific business problem, and such applications are written such that, if the business problem that an application is designed to address changes rapidly, so may the situational applications.

Situational applications contrast with more common enterprise applications, which are designed to address a large set of business problems, require meticulous planning, and impose a sometimes-slow and often-meticulous change process.

BRIEF SUMMARY

According to an aspect of the present disclosure, a method may include receiving process data corresponding to respective activated processes of a plurality of processes performed in a network. The process data may include identity data and activity data. The identity data may identify an identity that activated the respective activated processes. The activity data may identify a function performed by the respective activated processes. The method may include determining an identity token that corresponds to the identity data. The method may include determining an activity token that corresponds to the activity data. The method may include determining, by a processor system, a plurality of log data corresponding to the plurality of processes in the network. The plurality of log data may include log data for the respective activated processes. The log data may include the identity token and the activity token for each of the respective activated processes.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
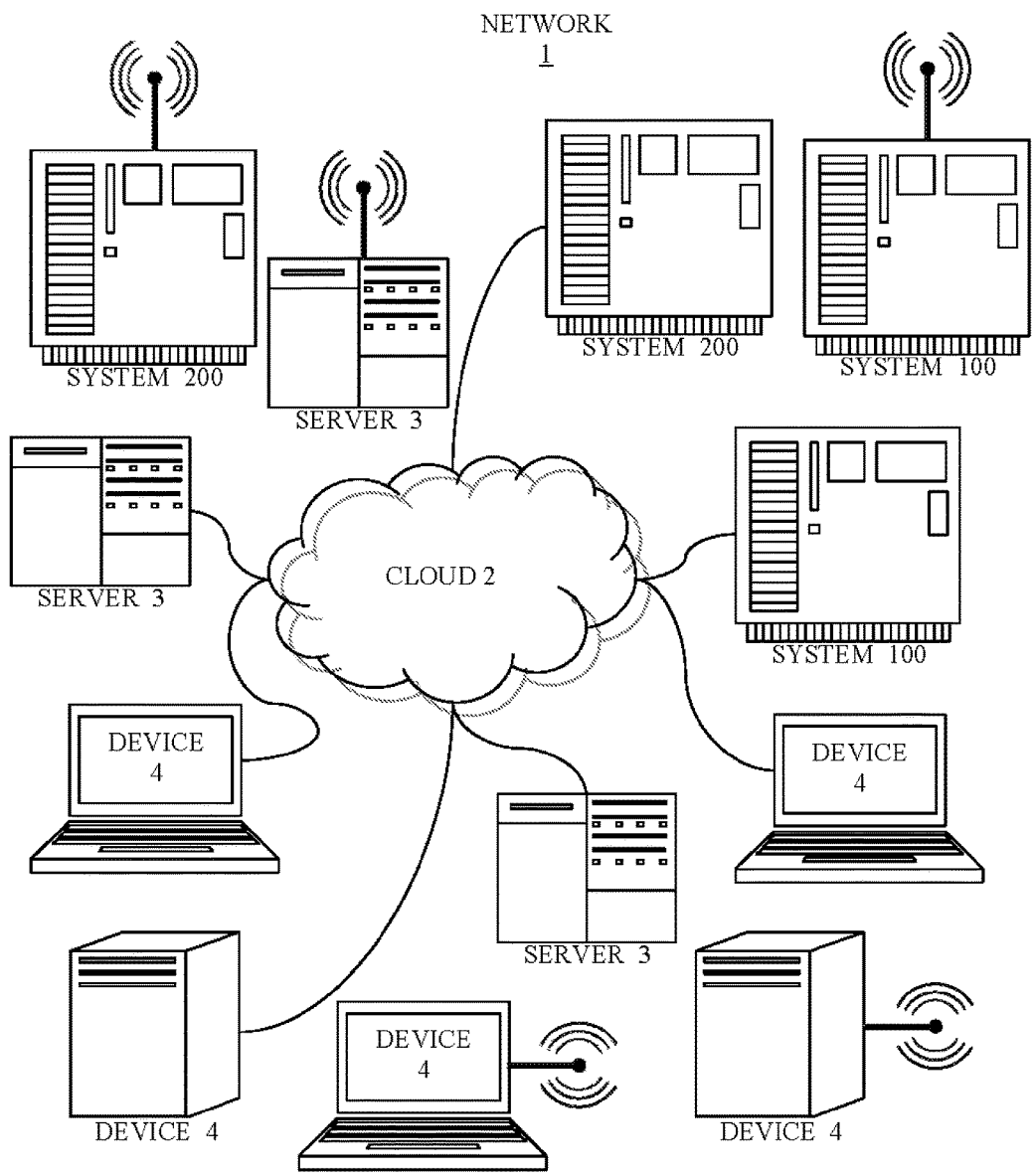
FIG. 1 is a schematic representation of a network 1 on which systems and methods for codification and representation of situational and complex application behavioral patterns and systems and methods for analysis and discovery of situational and complex applications may be implemented.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to performance management in cloud computing, systems and methods disclosed herein may be related to IT service and asset management in cloud computing, as well as in other areas related to cloud computing. Systems and methods disclosed herein may be applicable to a broad range of applications that monitor various parameters associated with various disciplines, such as, for example, industrial activities (e.g., power generation, manufacturing, refining, transportation, construction), commercial activities (e.g., sales, advertising, financial evaluation and modeling, inventory control), IT systems (e.g., performance monitoring, environmental monitoring, utilization monitoring, stress-testing, access control, provisioning services, bandwidth monitoring, packet-routing, network management), and other activities of importance to an entity that may utilize a number of processes to accomplish desired tasks.

The increasing prevalence of business-sourced applications (e.g., situational applications) and composite IT applications in the enterprise sphere may increase the difficulty and complexity of IT investment decision-making Increased decentralization of service sourcing, emergence of composite applications, and disintermediation of IT organization by the business may negatively impact the visibility and control that an organization may have over IT assets (e.g., hardware, software), service use, utilization of such services and assets, and costs associated with IT. Driven by a need for business agility, IT consumers may more frequently bypass the heavyweight processes of the IT department used in the past and may create their own "good enough" IT composite applications (e.g., situational applications) at a fraction of the time and cost of traditional IT programs. Such an approach may be easier for such IT consumers. Thus, the actual total IT spending may be scattered across the organization, which may increase the total cost of IT and may reduce the overall effectiveness of IT per unit cost (e.g., per dollar spent). Negotiation options may be bypassed, quality may be reduced, optimization opportunities may be missed, and the baffled IT department may be held accountable for both the slow results of managed projects and the chaos of the unmanaged usage.

Even if the IT department would like to and is able to help the business identify, procure, and consume these services, the business stakeholders may frequently be able to manage without the IT department. The nature of pay-per-use and renting services, which are available for short periods (e.g., a single day, an hour, a minute), may change the scope of planning options and control over the IT portfolio. Traditional IT management planning and forecasting may be optimized for well-planned, large systems but may not cope with an increasing number of applications that may cost as little as a few cents per access and are frequently accessed by IT consumers in the organization.

Consequently, the IT department may lose control of the assets and processes used by IT consumers, over-spending may be pervasive, and quality levels of assets and services may be highly variable. Because much of today's IT investment may soon become a commodity provided by a service provider, the IT department as it exists today may become irrelevant, and the chief information officer ("CIO") role may gradually disappear or transform.

Such changes in the IT environment may create a need for resources to support the CIO in evolving to higher management responsibility and maintaining relevance in the enterprise, such as, for example, enabling the role of the CIO to transition (1) from IT service operation to financial management of IT services and quality control, (2) from infrastructure management to composite application and cloud process management, and (3) from a focus on how to run systems to a focus on what services to use (e.g., obtaining the highest quality services at the lowest cost available). Consequently, the central IT activity may shift to proactive financial optimization of combined service use across the organization, support of the rapid delivery of services to the business stakeholder, and implementing schemes to automate and improve usage of the provided services.

The proliferation of situational applications throughout an organization may be referred to as situational application sprawl. Situational application sprawl may require the organization to focus IT resources and budgets and to decide where to invest IT resources and which applications to manage centrally. Consequently, it may be important to determine how an organization identifies areas in which there may be a need to invest or keep investing, as contrasted with areas that the organization may believe should not be supported and should be removed from the combined portfolio of IT applications and business sourced applications (e.g., situational applications) in the enterprise environment.

In addition, optimization of the service supply chain may be important. Therefore, if resources are limited, there may be tendency to manage all services with the same system and processes or to forego management of particular services or systems. Nevertheless, a single optimization strategy may not be appropriate for the entire spectrum of consumed services. Accordingly, applying a single optimization strategy to all services with the same system and processes may lead to overall overspending by management. Conversely, if certain services are not managed, quality issues may arise.

An important objective in today's business environment may be increasing one or more of agility and quality at a reasonable cost, rather than merely reducing costs. In certain cases, trade-offs in the IT portfolio may be unavoidable. For example, investing in one domain for increased service quality may require a reduction in another (e.g., due to re-budgeting or other financial constraints). Systematic over-engineering and over-management may lead to delays in delivery of key services and may generate a competitive disadvantage for an organization that relies on a traditional IT mindset. Competitors that may be better able to triage and differentiate critical services may reach the market more quickly than such an organization that relies on a traditional IT mindset. Consequently, such competitors also may reach customers more quickly and win a greater customer base.

To avoid encroachment by competitors, it may be important to proactively optimize IT processes and composite applications. Proactive optimization of IT processes and composite applications may comprise, for example, one or more of aligning pay-per-use license spending, focusing automation efforts on processes frequently-utilized or most-utilized in employee workflows, increasing usage of under-utilized systems through the influence of a community, and creating an ecosystem of composite IT applications and processes that may support problem resolution and provide assistance to IT consumers.

In existing process management systems, either the processes structure may be known (e.g., by design) and optimization may be performed on the design rather than through actual usage, or a discovery of a well-known protocol or system may be made. In either case, prior explicit knowledge of the system under investigation and potential known processes therein may be required (e.g., pattern matching approach). Consequently, the number of managed composite applications and business processes may be limited by the amount of IT staff. Further, applications created by the community and services accessed directly may be unknown to both the users and IT staff and may not be managed or utilized effectively or at all.

In existing process discovery schemes and methods of designing and implementing composite applications, existing systems for process management may focus on a structural approach, such as, for example, a design-deploy-monitor-improve process (e.g., QPR.com, IBM BPEL engines). The design process may be conducted using one or more of a modeling tool or similar implementation, a business service, and an orchestration (e.g., workflow) process. The designed integrated process may be provided to the end-users via one or more of workflow, orchestration, and coordination execution engines. For example, a compound process may involve many users activating mashup processes or dashboards, in which several portlets that may connect to different services may be co-located within a visual field (e.g., a particular screen or other display), that may form a compound structure. The different portlets may be interwoven in such a way that an action in one sub-screen may trigger an action in a different sub-screen. Some processes may be completely automated and may pass messages from system to system, and some processes may require human interactions via screens and actions.

Monitoring tools may monitor and analyze the amount of load and network traffic that may pass via these processes. In some instances, the monitoring tools may monitor and analyze the number of activations of one or more elements of these process (e.g., action requests performed during a connection process) by sniffing (e.g., listening to) incoming and outgoing messages from particular systems and associated network traffic. Consequently, such monitoring tools may provide measurements on the actual usage of a process.

Particular systems may record actual actions created by triggering systems or users, and may commence playback of these actions, which may trigger the exact steps again, which may allow particular systems to perform actions such as, for example, one or more of spying on the user, detecting insider threat misbehaver, detecting abnormal usage of the same process, and validating the usage of these planned processes.

Monitoring and status determination may be performed for one or more of improving a sub-service, regardless of the consumer (e.g., provider oriented performance), and evaluating the quality of the overall composite application and process (e.g., consumer oriented). Consequently, it may be beneficial to distinguish which composite application activates which sub-process, such that the quality and usage of the composite application may be verified. When different processes are using the same underlying common service or application, additional investigation (e.g., parsing) of the message/activation call may be performed, such that an origin of the request for service may be verified.

When an orchestration system is managing composite applications and services from a centralized process system (e.g., a "hub and spoke" control pattern coordination) or through a series of sequential delegated calls, such as, for example, a "chain of responsibility" design pattern approach, the measurement may be performed on the centralized system, rather than the edge systems (e.g., sub-service systems). Regardless, the underlying assumption that the structure of calls and participating components associated with the processes or composite applications is known, either explicitly (e.g., chained calls known by the sub-service and sub-process components) or implicitly (e.g., logical call known by the centralized control system), may be made with reasonable accuracy.

The successful large-scale implementation of a situational application environment in an organization may require one or more of a strategy, a mindset, a methodology, and a support structure quite different from traditional application development (e.g., the development of traditional enterprise applications). Such strategies, mindsets, methodologies, and support structures may evolve as more companies learn how to effectively leverage the ideas behind situational applications. In addition, the advent of cloud-based application development and deployment platforms may make the implementation of a comprehensive situational application environment much more feasible.

Thus, existing methods of process discovery, existing process management systems, and existing process design processes may not effectively handle the growing significance and role of situational applications in the IT environment. Accordingly, existing systems and methods may lack the ability to analyze the ever-expansive number of situational applications used in business environments.

In contrast to existing tools and process management systems which may focus on improving business processes that have been planned, provisioned, and monitored, systems and methods disclosed herein may discover actual composite applications and detect underlying process utilizations of such composite applications. Accordingly, systems and methods disclosed herein may highlight IT systems that may currently be in active use and may identify and track connectivity among the various IT systems. Consequently, systems and methods disclosed herein may utilize such information to determine and suggest improvements and optimization options (e.g., using alternative applications, re-writing applications to more effectively or efficiently perform core processes).

Rather than requiring organizations to invest in massive systems with deep capabilities, which are designed and defined by IT business and system analysts, systems and methods disclosed herein may support system designers in identifying composite applications and underlying processes that IT consumers in the organization are actually using and in capturing specifics on configured or customized composite applications. Accordingly, systems and methods disclosed herein may enable, for example, one or more of business owners, analysts, and enterprise architects (e.g., managers) to base investment decisions on actual usage and to prioritize projects, such that the impact of investment may be increased or optimized and quality and support may be improved. In addition, systems and methods disclosed herein may enable such managers to align resource and service availability based on existing usage patterns and options in service costs, which may reduce or minimize spending on the fly.

In particular configurations, systems and methods disclosed herein may assist business owners and process analysts to: (1) identify cloud-based or composite applications in active use in the organization, comprising processes sanctioned by IT and business-driven, "rogue" implementations; (2) determine which IT composite applications would benefit significantly from process automation or process optimization in order to increase workforce productivity; (3) identify redundant or unused IT systems by tracking usage or lack of use, and reporting on assets and licenses that may be harvested and repurposed or retired; (4) suggest one or more of actual orchestrations, workflows, and interface design changes to improve human-based process interactions; and (5) recommend specific, cloud-based enterprise integrations, automation processes, and other system improvements or optimizations.

For example, systems and methods disclosed herein may discover and catalogue unknown and existing cloud-based processes, may proactively suggest improvements or optimizations to such processes, and may increase application utilization by business entities from Medium to Enterprise organizations. Such systems and methods may suggest constant improvements, based on tracking and analyzing human-machine interactions, across cloud domains and in hybrid environments, focusing on actual users' behavior and crowd intelligence. In some configurations, for example, such systems and methods may enable the community itself, through implicit or explicit means, to decide which among competing business processes are best and to target such business processes for improvement or optimization.

Consequently, systems and methods disclosed herein may reduce wasted human effort and time and may eliminate unproductive IT systems development and maintenance in an agile and incremental approach. For example, such systems and methods may even report on the amount of wasted time, detect lengthy or non-streamlined processes, and suggest which processes are common and are frequently activated in the domain. Accordingly, such systems and methods may enable businesses to focus attention where the return on investment in improvements is likely to be high.

Business process analysis and implementation may be performed using a waterfall method. Such a waterfall method may start with an analysis of a currently utilized process (e.g., a process currently utilized by business users). Subsequently, the organization's needs may be determined, and the waterfall method may continue when a new business or IT process is suggested or developed. In many systems, the usability and efficiency of the implemented process or business may not be considered after production, except, for example, if users reject the system, because even obtaining the information used for such post-implementation improvement may be just as difficult as analyzing the existing process before the change.

Systems and methods disclosed herein may provide ongoing feedback and analytics on high-impact areas of investment (e.g., daily, weekly, monthly, quarterly) based on an organizations agility requirements. Such systems and methods may cater to a plurality of contributors to the overall IT value chain that may comprise, for example, internal enterprise business owners and the IT business process analysts that may support them, software vendors that may provide business or IT processes as a core part of the venders' offerings (e.g., ERP, CRM, IT management), and managed service providers that may deliver SLA-driven business processes measured through outcome.

In particular configurations, systems and methods disclosed herein may focus on the domain of situational applications, in which centralized IT may not be involved. Nevertheless, such systems and methods may be used in many other domains, in which it may be useful to detect and understand processes underlying composite applications and services.

Existing systems may not learn (e.g., discover) which services are accessed and what compound applications are implemented by such services or processes. Consequently, existing systems may not inform interested parties of the services and compound applications being utilized and may not effectively manage the services and compound applications, or even the business IT system, in general. Such problems may be a result of economics of scale, in which an IT division and a CIO simply may not be able to design or manage a large number of applications serving the diverse needs of a plurality of members of a business community. Thus, the proliferation of situational applications in a business simply may be difficult to manage, if not unmanageable, using existing systems.

Systems and methods disclosed herein may provide a means for scientific proactive discovery of composite applications and processes (e.g., situational applications or other processes operating together to achieve desired business goals or other tasks) and for improvement or optimization of an activation order. While systems and methods disclosed herein may, in certain configurations, be capable of performing operations corresponding to a centralized design-production-change process management technology, in which the processes may be known by design, or in which specific permutations of the processes may be searched for and identified, systems and methods disclosed herein may be configured to perform more dynamic operations. In particular, systems and methods disclosed herein may discover actual processes and interactions based on statistical and probability-based methods (e.g., scientific methods) of discovery of real process created by one or more of humans, processors, and other workflow engines (e.g., proactive discovery of situational composite applications and processes). The discovery process may be followed by several different analysis and optimization offerings, for example, such as those based on the same basic statistical analysis used to discover the relevant situational composite applications and processes.

In many configurations, the optimization or improvement process may focus on one or more of reusable sub-processes and re-order of process activation. Accordingly, systems and methods disclosed herein may discover workflow (e.g., collocated activities of composite applications as orchestrated by one or more of humans, machines, and others) and may evaluate the discovered composite applications against IT management systems in order to produce recommendations or suggestions that identify different value propositions and different approaches to IT services and applications management.

In particular configurations, systems and methods disclosed herein may discover and create a unique structural description of situational application and composite processes in enterprise or other environments, which may comprise a codified bi-directional graph structure (e.g., a statistical analytical graph) that may enable the analysis of the discovered processes and the determination of particular business analytics.

In certain configurations, systems and methods disclosed herein may discover and codify the level of importance (e.g., perform triage) of situational application and composite processes in enterprise or other environments. Such systems and methods may implement a narrowed statistical scan and cluster analysis, which may be based on, for example, a dedicated and proprietary DNA data structure, or, more generally, any codified data structures. In some configurations, such codified data structures may even comprise one or more of data structures created by centralized orchestration systems and data structures describing process usage. In certain configurations, systems and methods disclosed herein may, for example, operate in accordance with an assumption that a statistical behavior data structure of process activation exists, regardless of how such data structure may have been formed.

In certain configurations, systems and methods disclosed herein may filter and cluster (e.g., detectable patterns) navigation paths according to profiles (e.g., rules, bands, network segments) and may provide structured navigation graphs of discovery process activities. Systems and methods disclosed herein may compare the detected patterns with known existing processes (e.g., one or more of processes created by centralized systems and previously detected processes). Consequently, permutations of situational applications may readily be detected and searched by accounting for mutated situational applications. Further, such detection and searching may be performed according to demand (e.g., pattern hatching based on a need).

In many configurations, systems and methods disclosed herein may focus on the desire to identify and codify one or more of cloud-based, situational applications and composite applications that may be in active use in the organization. Such cloud-based, situational applications and composite applications may comprise processes sanctioned by IT, as well as business-driven, "rogue" implementations (e.g., applications used by business users without the approval or knowledge of IT) and new permutations of existing, "similar" situational and composite applications.

To assist in the analysis of large scales of information related to potential process to be managed, for example, systems and methods disclosed herein may utilize unique codified structures and specific warehousing of data (e.g., methods of leveraging big data repositories), which may enable business analytics applications and statistical applications to generate behavioral patterns for use by analysis tools.

In particular configurations, systems and methods disclosed herein may focus on fundamental structures of codified data (referred to as a "DNA data structure"), which may correspond to the warehousing structure (e.g., an extract, transform, and load ("ETL") structure) component of business analytics for situational and composite applications and processes. Such systems may record navigation (e.g., process orchestration) actions of real processes, may replace and store these actions with dedicated codification (e.g., codifying each of action information, user information, and environmental information) and an assigned key. The sequence of activation (e.g., behavioral profile) may be structured as a graph (e.g., the user/system situational application DNA data structure). Some or all of the sequences may be transformed to a centralized perspective navigation map that may function as a statistical warehouse of codified information for all processes and interactions. The centralized perspective navigation map may indicate the arches and nodes on the graph as navigation and activity direction, which may comprise an indication of statistical count. The system may provide different views of usage patterns according to different filters (e.g., role, time, band).

The system may create one or more of the following data stores for business analytics: (1) activity log (e.g., matching actions and codified token that may reduce load and scale); (2) a statistical end-user navigation storage (e.g., transient transformation steps that may enrich information for subsequent analysis); and (3) a collection (e.g., plurality) of storages according to filters for highly observable (e.g., according to sensitivity) information from monitored areas. For example, the collection of storages according to filters for highly observable information from monitored areas may correspond to OALP cubes in business analytics. In some configurations, the collection of storages may be structured differently from other data structures (e.g., NoSQL structures, graphs).

Thus, the system may statistically highlight actual processes (e.g., statistical correlated navigation/activation behavioral patterns) and interactions based on monitoring and aggregating information about activations of real processes created by one or more of humans, machines and other workflow engines. Consequently, the system may perform proactive discovery of situational composite applications and processes. Such features may be more robust and useful than a centralized design-production-change process management technology, in which the processes may be known by design or in which specific processes may be searchable as specific permutations of known processes.

The system components may comprise one or more devices that perform processes comprising one or more of: (1) real action recording; (2) token creation; (3) activity log creation; (4) log collection; (5) end-user navigation map generation; and (6) perspective navigation map generation. Such components may be implemented, for example, by one or more processors configured to function as one or more of: a log information receiving (e.g., log collection) device comprising one or more of a process information receiving (e.g., real action recording) device, a token determining (e.g., token creation or generation) device, and a log determining (e.g., activity log creation or generation) device; and a map generation device comprising an identity navigation map generating (e.g., end-user navigation map creation or generation, end-system navigation map creation or generation) device and a perspective navigation map generating (e.g., perspective navigation map creation or generation) device.

In the process of real action recording, the system may record real actions (e.g., commands, request). In particular, the system may record the actual innovation-triggering calls (e.g., URL or http request message, triggered by either humans or machines, to another web site or web service) from each system or user under investigation. Nevertheless, the detection of actions (e.g., commands and activities) may not be limited to web protocols, such as, for example, http or ftp, but rather may depend on the actual monitoring tool installed. Web monitoring may be performed remotely, without agents, or may require installed technology (e.g., local installations). The recording may be performed on the end user machine or device, whether mobile or fixed, and whether laptop or cellular, and may collect information from, for example, one or more of ports of outgoing activity, network switches, and other locations (e.g., nodes, routers, inbound ports, gateways) on the network. The information collected may, for example, identify one or more of an IP address of the activation, a MAC address of the activation, and other location information about the activation on the network. The system may utilize a data structure that may reduce or minimize the resources (e.g., memory, other storage space, processing power) required to store activity information about a network or a portion thereof and may facilitate the identification of the activation identity. Further, when more access is permitted to systems that are closer to the end-user (e.g., installing an agent on the monitored machine), the system may become more accurate (e.g., with the collection of more identity data about users of the monitored machine).

In the process of token creation, the system may create a token. In particular, the system may generate an equivalent token (e.g., a codified representation) for each type of activation and target (e.g., triggered navigation request). The token may replace long string-based descriptors and may utilize less storage space and processing power than such long string-based descriptors. The token may, for example, be based on one or more of the targeted system, the sub-domain of the targeted system, and the type of action. For example, a token may be based on and represent a main URL, sub-pages associated with the main URL (e.g., domain space), and codified parameter types or forms, such as the call variables (e.g., http request/get/set). The system may maintain and store a codified token representing or associated with the identity of a consumer (described below in more detail, with respect to the process of activity log creation) that may be generated in the system or provided by an identity management system. Consequently, the identity may be replaced by a token, which may enable observation of statistics without necessarily divulging real identities. For example, a user identity token may represent the identity of an orchestration entity (e.g., roles, additional descriptive data) that initiated an action.

In the process of activity log creation, the system may create an activity log. In particular, the system may replace the actual request and the activated system identity with one or more codified token (e.g., a token provided by the token creation component) and with codified token). Thus, the system may create a combined token indicating "who did what" (e.g., a "who did what" description) along with a timeline (e.g., a "what happened when" description) and an identification of the machine or geographical location from which the request was made (e.g., a "where did it happen" description).

In the process of log collection, the system may collect log information. In particular, the system may collect activity log information from one or a plurality of monitored endpoints of the network over a period of time. The system may collect the activity log information from different endpoints at different times or the same time. In some configurations, the system may collect the activity log information at predetermined time intervals, at random time intervals, when specified events occur, or upon other conditions or in other time intervals.

In the process of end-user navigation map generation, the system may generate an end-user navigation map. In particular, the system may construct a behavior graph (e.g., a base analysis map, a warehouse of information, both). For example, the system may create an aggregated statistical graph (e.g., a navigation map) for each endpoint (e.g., a monitored system, a monitored user). The aggregated statistical graph may represent one or more of a sequence of triggered actions (e.g., sequence of activation) and a sequence of navigation actions (e.g., an order of activities, which activity was performed after what activity). The system may accumulate the repeated activities and generate, for example, a histogram of repeated sequences navigation. The aggregated statistical graph may comprise the histogram of repeated sequences navigation in some configurations. Moreover, the system may analyze and generate graphic information corresponding to durations of pause between particular events (e.g., stochastic events distribution). In some configurations, the system may generate a system navigation map, rather than or in addition to an end-user navigation map, during the navigation map generation process described above. Such system navigation maps may be generated, for example, when end-user information is one or more of unavailable, uncollected, and unneeded or when system navigation maps may be more appropriate than or complimentary to end-user navigation maps.

In the process of perspective navigation map generation, the system may generate a perspective navigation map (e.g., a core analysis map, a warehouse of information, both). The system may accumulate end-user maps and system maps over a period of time, which may potentially reduce statistical bias and measurement noise. The threshold created by statistical bias and measurement noise may define the statistical sensitivity of the system. The resulting set of navigation maps may be a graph that may represent the activities of a plurality of monitored systems, monitored users, or both over time. Such a graph may assist in the identification of composite processes and applications over time and may be provided to other services for further analysis. A repeating sequential activation with the highest statistics (e.g., a greatest frequency) among monitored activations may suggest a recurring pattern (e.g., a pattern that may be detected by one or more of cluster processes and sorting processes) and may highlight a probable, repeating composite application process (e.g., within a structured system, within an aggregated system of situational applications that an end-user or a system may have created itself). The system may create one or more perspective maps based on the mass collection of data (e.g., graphs) and the correlated stochastic timing of the data. Each graph may correspond to a single dimension of meta-data (e.g., a particular element of the data structure storing the token) that may describe the user or system or a certain tag (e.g., category). For example, such perspective navigation maps may be based on one or more of organizational roles, departments, band (e.g., rank within an organization), and labor types. Aggregation may be performed in different ways and may appear in different forms. For example, simple aggregation (e.g., counting) may be used as an aggregation process in some configurations. Alternatively or additionally, statistical average (e.g., normalized weighted average) accumulation may be used as an aggregation process. Moreover, one of the navigational perspective maps may be a generic map that may accumulate, for example, all users, without applying a filter.

The system components disclosed herein and the associated data structures may provide sufficient flexibility for a plurality of analysis and optimization options, which may uniquely follow recommended patterns for business analytics of situational applications, yet may provide improved data structures, statistics and resulting analytics information.

As described above, systems and methods disclosed herein may implement a DNA data structure during a data warehousing process. The data warehousing process may be, for example, an extract, transform, and load ("ETL") process. The ETL process may comprise a plurality of sub-processes (e.g., an extracting sub-process, a transforming sub-process, a loading sub-process).

During the extracting sub-process, the system may monitor a parameter. Further, the system may record a value for the parameter and may load the value in a local storage location (e.g., a memory or other storage media). The system disclosed herein may load a codified (e.g., changed) value in a data structure that may represent the recorded information (e.g., meta-data) in a lean and efficient manner. Consequently, the system may create a particular data store that may efficiently be used for trail auditing and compliance analytics.

During the transforming sub-process, which may be performed on a centralized system, the system may gradually transform recorded meta-data information into statistical graph structures that may capture different process nodes. Consequently, the system may create a certain data store (e.g., an aggregated, raw warehouse of data) that may be used for root-cause analytics.

During the loading sub-process, the system may create various perspectives, based on desired analytical views, for a collection of users and systems. Consequently, the system may create a further data store that may be used for enterprise analytics.

Accordingly, the ETL process applied to situational applications may discover active processes and may map the connectivity (e.g., orchestration actions) of such processes into a common data structure, which may, for example, be uniquely structured as the process DNA.

By performing a combination of at least a portion of the above-described processes, systems and methods disclosed herein may discover or enable discovery of situational applications in a novel manner. In particular, such systems may efficiently handle the massive processing loads, data storage requirements, and other resource burdens associated with the sprawl of situational applications. Further, such systems may serve as the backbone of a plurality of optimization systems and business analytics systems that may have dramatic implications in business and may drive business decisions. For example, detection and evaluation of situational applications and associated processes may be important for the IT business, which must constantly invest to maintain and improve business systems. Further, detection and evaluation of situational applications and associated processes may, for example, be important because it may allow IT analysts to detect repeated access to external systems that may not be sufficiently cost effective (e.g., redundant subscriptions to a service within a business). Accordingly, customers that may be involved in the development process (e.g., rough development) and that may use external systems may desire a means to leverage and pro-actively enhance these services in a manner that may reduce costs and increase security, without direct responsibility for controlling all of the various rough services. In many configurations, systems and methods disclosed herein may provide such services.

In certain configurations, systems and methods disclosed herein may provide probability information indicating a probability that a situational application or composite process has been discovered, either of which may be unknown to the IT process managers. Accordingly, such probability information and the potential discovery of a previously-unknown (e.g., unknown to IT managers, but potentially known to users) situational application or composite process may focus managers' efforts toward potential improvement areas. In some configurations, such probability information may be determined from the processes described above (e.g., one or more of real action recording, token creation, activity log creation, log collection, end-user navigation map generation, and perspective navigation map generation).

Given a structure of navigation maps that may have been statistically aggregated (e.g., harvested into warehouses, as described above), systems and methods disclosed herein may detect highly usable situational applications through the performance of one or more process of a plurality of processes. In particular, the system components may comprise one or more devices that perform processes comprising one or more of: (1) partially selecting statistical nodes and activities; (2) collecting filtered data to be analyzed; (3) correlating cluster analysis over different maps; (4) comparing detected clusters with known processes; (5) repeating the above-described processes (1)-(4) based on certain factors; and (6) providing a list of newly detected situational applications and processes. Such components may be implemented, for example, by one or more processors configured to function as one or more of: a log information receiving (e.g., partially selecting statistical nodes and activities, collecting filtered data to be analyzed) device, a log information filtering (e.g., partially selecting statistical nodes and activities, collecting filtered data to be analyzed) device, a cluster determining (e.g., correlating cluster analysis over different maps, comparing detected clusters with known processes), a list determining device (e.g., providing a list of newly detected situational applications and processes), and a map generating device (e.g., providing a navigation map depicting newly detected situational applications and processes).

In the process of partially selecting statistical nodes and activities, the system may, for example, partially select statistical nodes and activities (e.g., average over different time windows) according to a prioritization order (e.g., ranges of statistical counts, over different periodical time spans). Thus, the system may reduce the load of data to be analyzed based on such prioritization.

In the process of collecting filtered data to be analyzed, the system may, for example, collect filtered data to be analyzed based on the identification profiles of suspected users (e.g., business units, other characteristics). For example, in some configurations, only filtered data corresponding to a subset of users having particular attributes or a particular history of activity may be collected. The resulting collection of filtered data may be incorporated into a set of universal navigation maps (described below in more detail).

In the process of correlating cluster analysis over different maps, the system may, for example, correlate cluster analysis over different maps to detect behavioral similarity (e.g., raw, view-based, universal). Moreover, the system may provide cluster detection according to, for example, one or more of a time profile, a sequence, a role, and other potentially linking information.

In the process of comparing detected clusters with known processes, the system may, for example, compare the detected clusters (e.g., harvested patterns) with existing, known modeled processes. Thus, in some configurations, for example, the system may classify whether a cluster comprises a previously-unknown (e.g., unknown to IT managers or business managers, new) process or application or an existing process or application. Moreover, in some configurations, for example, the system may determine a level of similarity (e.g., mutation) between the detected clusters and the known processes. In some configurations, the level of similarity may be used to determine whether an application or process is unknown or known.

In the process of repeating the above-described processes, the system may, for example, repeat the previously-performed processes of partially selecting statistical nodes and activities, collecting filtered data to be analyzed, correlating cluster analysis over different maps, and comparing detected clusters with known processes. In particular, the system may repeat the previously-performed processes according to one or more of granularity, domain, and search band. Thus, the system may constantly scan the entire enterprise.

In the process of providing a list of newly detected situational applications and processes, the system may, for example, provide a list of newly detected situational applications and processes for further management. The list may comprise underlying details on the nature of activators of the process and process points of interactions (e.g., process profile).

In certain configurations, the system components may comprise one or more devices that perform processes comprising one or more of: (1) codifying candidate composite applications and associated processes; (2) generating universal navigation maps; (3) locating composite applications and associated processes; and (4) identifying or discovering composite applications and associated processes. Such components may be implemented, for example, by one or more processors configured to function as one or more of: a log information receiving (e.g., codifying candidate composite applications and associated processes) device, a map generating device (e.g., navigation map creation or generation), a log information filtering (e.g., reducing data to a more manageable size for analysis) device, a cluster determining (e.g., locating composite applications and associated processes, identifying or discovering composite applications and associated processes), and a list determining device (e.g., identifying or discovering composite applications and associated processes).

In the process of codifying candidate composite applications and associated processes, the system may codify (e.g., enrich, normalize by providing coded entries in place of certain descriptive information) candidate composite applications. In particular, the discovered repeating composite applications (e.g., behavioral patterns based on statistical counting over time) may be associated with one or more of a monitored user and a monitored system for further analysis.

In the process of generating universal navigation maps, the system may generate universal navigation maps (e.g., the end-user navigation maps and perspective navigation maps described above) based on information from a plurality of enterprises (e.g., all serviced enterprises or business units, a portion of the serviced enterprises or business units) and the community at large e.g., all users or systems, a portion of all users or systems). During the process of generating universal system maps, the system may normalize on-demand profiling data for analytics. In particular, the systems may receive (e.g., collect, gather, obtain) information from a plurality (e.g., all, a portion thereof) systems and users under monitoring. Endpoint navigation map graphs may be superimposed, which may create a structure of compound graphs (e.g., universal navigation maps) that may be based on a codified profile (e.g., role, geography, time) of a user or system. Further, in some configurations, the structure of compound graphs may comprise sterilized data (e.g., clean data, data without private or corporate information). Such activity (e.g., superimposing maps, generating universal navigation maps overall, normalizing data) may be performed on demand and may be in preparation for additional analysis. For example, aggregations of codified data may be performed on information about one or more of users from a same enterprise, consumers of the system from many enterprises (e.g., multi-tenants), and other groups of users and systems. Such large-scale aggregation over many enterprises may be performed effectively because sensitive data may be cleaned or eliminated based on the permission provided by each enterprise. Accordingly, sensitive data may not be received by unauthorized enterprises.

In the process of locating composite applications and associated processes, the system may function as a navigational regional cluster ("NAVROC") detector. The NAVROC detector may be applied to a plurality of types of maps (e.g., end user maps, perspective maps, universal maps) and may perform cluster or similar grouping techniques that may show areas (e.g., navigation nodes and directions on a graph) in which a high activity path may be detected. Specifically, the NAVROC detector may determine that clusters of composite applications exist (e.g., detect the clusters of composite applications) at areas where a large number of sequential activations occur (e.g., an area at which most of the sequential activations occur). The detected areas may be grouped according to one or more of end-user tagging and system tagging (e.g., identified roles, identified origin). The detected areas may even be compared between different types of maps. Such comparisons and groupings may assist in the process of detecting activity structures (e.g., clusters). Such detected clusters of navigation activities and actions may be a community based on navigation activity and may be referred to as "navigational regional clusters." The size of a NAVROC (e.g., number of navigation nodes, statistics) may determine the probability of correctly detecting an activity.

In the process of identifying or discovering composite applications and associated processes, the system may identify and classify detected NAVROCs (e.g., human activity, machine activity, processes) that may be known (e.g., within formal modeling systems) and may discover detected NAVROCs that may be previously-unknown (e.g., unknown to the system, new) business process and composite applications. The system may automatically identify detected NAVROCs that are similar to (e.g., permutations of, adaptations of) known or previously-discovered NAVROCs, based on a distance functions, such as, for example, least mean square ("LMS") analysis.

Systems and methods disclosed herein may discover previously unknown (e.g., new, unidentified, unknown to IT managers) processes existing in the enterprise environment that may be currently performed by enterprise users or systems. Such systems and methods may utilize a monitored data warehouse that may be ready for analytics in a certain statistical forms.

Systems and methods disclosed herein may utilize the statistical sensitivity of usage activity and grouping aggregation, which may be based on user profiles or system profiles, to create dedicated views for investigation. The system may cluster the highly visible navigation points in a graph (e.g., a highly statistically scored path between nodes and arches), which may indicate the detection of a navigation pattern or path, and may compare this structured navigation path to existing known process orchestrations (e.g., known workflow patterns). Similarity and matching processes may be used to determine whether a discovered process is one of a new or unknown process, a permutation of a known or previously-discovered process, or an existing process. The discovered process and a corresponding categorization of the process (e.g., categorization by importance, triage) may be presented to an analyst (e.g., human, machine) for one or more of further optimization, further improvement, and further decision-making.

Detection of situational applications may provide significant support to IT managers and business decision-makers. For example, detection of situational applications performed by systems disclosed herein may provide a wealth of information which assets and resources within an enterprise are actually utilized and may enable decision-makers to determine the predicted efficiency of and provide rational for further investment in IT services or for modifying current investments in IT services. In particular, systems disclosed herein may detect these potential processes and may indicate and pin-point one or more of potential areas in which further investments may be beneficial, which applications are frequently utilized (e.g., activated) or utilized on a large scale, and who or what is utilizing such applications.

In many configurations, systems and methods disclosed herein may profile the actual usage of internal and external cloud services in an efficient manner by discovering the elements of an application, rather than merely evaluating infrastructure. Thus, such systems and methods may, for example, enable customers to identify cloud-based or composite applications, which may be in active use within the organization, and which may comprise processes sanctioned by IT as well as business-driven "rogue" implementations. Moreover, such systems and methods may, for example, enable customers to determine which IT composite applications may significantly benefit (e.g., most benefit) from process automation or process optimization and improvement, as a means for increasing workforce productivity.

Referring now to FIG. 1, a network 1 for codification and representation of situational and complex application behavioral patterns and for analysis and discovery of situational and complex applications now is disclosed. Network 1 may comprise one or more clouds 2, which may be public clouds, private clouds, or community clouds. Each cloud 2 may permit the exchange of information, services, and other resources between various identities (e.g., users, systems) that are connected to such clouds 2. In certain configurations, cloud 2 may be a wide area network, such as the Internet. In some configurations, cloud 2 may be a local area network, such as an intranet. In some configurations, cloud 2 may be a closed, private network in certain configurations, and cloud 2 may be an open network in other configurations. Cloud 2 may facilitate wired or wireless communications between identities and may permit identities to access various resources of network 1. For example, cloud 2 may be one or more of a commodity cloud (e.g., Internet-facing web-scaling clouds, such as Amazon Web Services), a public cloud (e.g., multi-tenant clouds that may be one or more of Internet-access-based and private-access-based), and a private cloud (e.g., a dedicated, single-tenant, virtualized technology).

Network 1 may comprise one or more servers 3 that may at least store resources thereon, host resources thereon, run situational applications, or otherwise make resources available for certain identities. Such resources may comprise, but are not limited to, information technology services, financial services, business services, access services, other resource-provisioning services, secured files and information, unsecured files and information, accounts, situational and other applications, and other resources desired by one or more entities. In some configurations, for example, one or more server 3 may even provide a service of monitoring and analyzing the utilization of resources and associated processes in network 1. More generally, servers 3 may comprise, for example, one or more of general purpose computing devices, specialized computing devices, mainframe devices, wired devices, wireless devices, and other devices configured to provide resources to consumers.

Network 1 may comprise one or more devices 4, which may enable certain identities to access certain resources via one or more servers 3, which, in some configurations, may connect to the one or more devices 4 via cloud 2 or via other network routes. Devices 4 may comprise, for example, one or more of general purpose computing devices, specialized computing devices, mobile devices, wired devices, wireless devices, passive devices, routers, switches, and other devices utilized by consumers of provided services. In certain configurations, a device 4 may be configured to perform the same functions as a server 3 in addition to the functions of a device 4 set forth above, a server 3 may be configured to perform the same functions as a device 4 in addition to the functions of a server 3 set forth above, and it may not be necessary to access resources via network 1 or cloud 2 (e.g., a system comprising an input device, such as a keyboard or mouse, performing the functionality of device 3 and a general purpose computer performing the functionality of server 4). For example, devices 4 may directly execute the processes associated with situational or complex applications (e.g., "rogue" applications).

Moreover, network 1 may comprise one or more system 100 that may monitor processes performed by servers 3 and devices 4 (e.g., processes associated with situational or complex applications, processes associated with enterprise-level applications) and may collect information about such processes. In certain configurations, such information may comprise, for example, one or more of information about an identity (e.g., a particular user identity, a particular system identity) that activates a process; one or more of time, date, and sequence information associated with the process; frequency information associated with the process; a quantity activations of the process; one or more of location and geography information identifying one or more of where and on which device the process was performed; and information about the effects of performing the process. In this manner, for example, system 100 may function as the log information receiving device described above. Moreover, system 100 may, for example, function as a map generating device that may generate identity navigation maps and perspective navigation maps, as described above. System 100 may be, for example, one or more of a general purpose computing device, a specialized computing device, a wired device, a wireless device, and any other device configured monitor and analyze information.

System 100 may connect to cloud 2 and monitor servers 3 and devices 4. By monitoring servers 3 and devices 4, system 100 may generate rich datasets regarding many identities; many processes associated with situational or complex applications; and the utilization and access of such processes and associated resources. System 100 may utilize these data sets to analyze processes activated by one or more identities, and may generate maps providing significant insight into the behavior of network 1 and, more specifically, the behavior of complex and situational applications running on network 1. In this manner, system 100 may codify and represent situational and complex behavior patterns.

In addition, network 1 may comprise one or more system 200 that may analyze process information about processes performed by servers 3 and devices 4 (e.g., processes associated with situational or complex applications, processes associated with enterprise-level applications) and may discover situational and complex applications that may instruct servers 3 and devices 4 to perform such processes. System 200 may perform functions similar to those performed by system 100. For example, system 200 may function as the log information receiving device described above. System 200 may, for example, function as the log information filtering device that may filter the log information to obtain a portion of the log information that is more manageable for analysis, as described above. Further, system 200 may, for example, function as the cluster determining device and the list determining device, which may, respectively, analyze the filtered portion of the log information to discover clusters of processes associated with complex and situational applications and generate a list of the discovered complex and situational applications. Moreover, system 200 may, for example, function as a map generating device that may generate navigation maps, as described above. Such navigation maps may be associated with processes implemented by the discovered situational and complex applications. System 200 may be, for example, one or more of a general purpose computing device, a specialized computing device, a wired device, a wireless device, and any other device configured monitor and analyze information.

System 200 may connect to cloud 2 and monitor and analyze information from servers 3 and devices 4. By monitoring servers 3 and devices 4, system 200 may generate and analyze rich datasets regarding many identities; many processes associated with situational or complex applications; and the utilization and access of such processes and associated resources. System 200 may utilize these data sets to analyze processes activated by one or more identities, and may discover and identify complex and situational applications running on network 1. In this manner, system 100 may analyze process data and discover situational and complex applications operating within network 1.

In some configurations, one or more of a server 3 and a device 4 may comprise one or more of system 100 and system 200. Accordingly, one or more of system 100 and system 200 may be an integral component of the one or more of server 3 and device 4 and may connect directly thereto, rather than via cloud 2 or another network connection. In other configurations, one or more of system 100 and system 200 may be separate from servers 3 and devices 4. Moreover, in some configurations, one of system 100 and system 200 may comprise the other of system 100 and system 200. Accordingly, combined system 100 and 200 may implement certain components of system 100 and system 200 on one or more CPUs and redundant components may be omitted.

Figure 2:
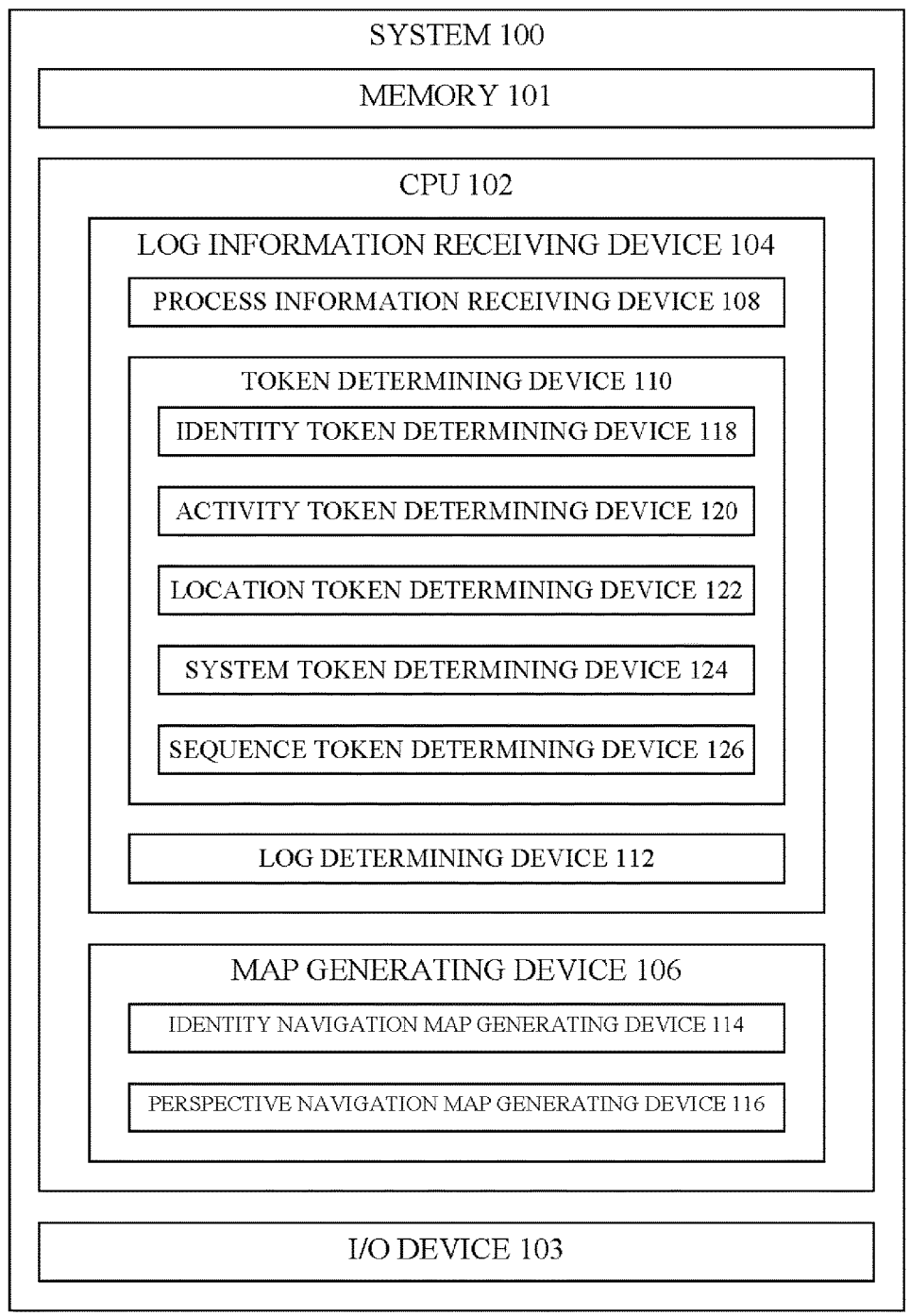
FIG. 2 is a schematic representation of a system configured to codify and represent situational and complex behavior patterns.

Referring now to FIG. 2, system 100, which may codify and represent situational and complex behavior patterns, now is disclosed. System 100 may comprise a memory 101, a CPU 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a log information receiving device 104 and a map generating device 106. More specifically, for example, CPU 102 may operate as one or more of a process information receiving device 108, a token determining device 110, and a log determining device 112 when the computer-readable instructions stored in memory 101 instruct CPU 102 to operate as log information receiving device 104. Further, for example, when executed by CPU 102, the computer-readable instructions stored in memory 101 may instruct CPU 102 to operate as one or more of an identity token determining device 118, an activity token determining device 120, a location token determining device 122, a system token determining device 124, and a sequence token determining device 126 when the computer-readable instructions stored in memory 101 instruct CPU 102 to operate as token determining device 110. Moreover, for example, when executed by CPU 102, the computer-readable instructions stored in memory 101 may instruct CPU 102 to operate as one or more of an identity navigation map generating device 114 and a perspective navigation map generating device 116 when the computer-readable instructions stored in memory 101 instruct CPU 102 to operate as map generating device 106.

In particular configurations, devices 104 through 126 may be implemented by a processor system, for example. The processor system may be hardware comprising one or more CPUs. The processor system may comprise one or more CPUs integrated into local hardware (e.g., a plurality of CPUs in a same server, a plurality of processing cores in a same silicon chip), one or more CPUs integrated into remote hardware (e.g., a plurality of CPUs in different servers in the same server room, a plurality of CPUs in different servers in different geographic locations), or a combination of one or more CPUs integrated into local hardware and one or more CPUs integrated into remote hardware. Each of devices 104 through 126 may be implemented by at least one of the one or more CPUs. Thus, in some configurations, one or more of devices 104 through 126 may be implemented on different CPUs of the processor system. In other configurations, one or more of devices 104 through 126 may be implemented on a same CPU of the processor system. In some configurations, system 100 may not comprise one or more of devices 104 through 126. I/O device 103 may transmit data to cloud 2, may transmit data to other devices connected to system 100, and may transmit a notification (e.g., display a message, make a sound, send an email, make a telephone call) or other information (e.g., end-user navigation map, end-system navigation map, perspective navigation map) to a network manager, a management system, or other entity. In some configurations, the notification or other information may be displayed on a display (not depicted) for analysis by a user. Further, I/O device 103 may implement one or more of wireless and wired communication between system 100 and other devices.

Figure 3:
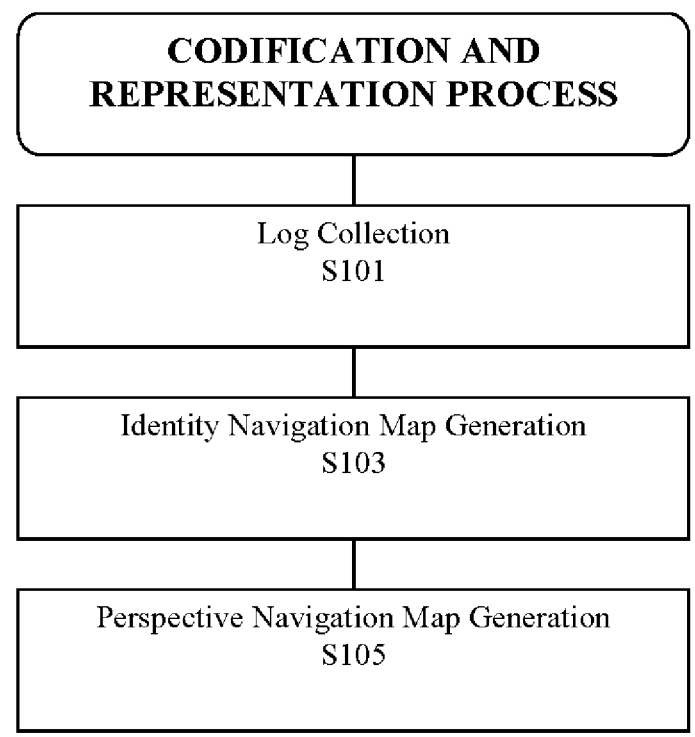
FIG. 3 illustrates a codification and representation process.

Referring now to FIG. 3, a codification and representation process, in which system 100 may monitor processes performed by one or more situational and complex application and, for example, may generate one or more navigation map comprising one or more statistical graph and histogram based on the monitored processes, now is disclosed. In some configurations, system 100 also may monitor processes performed by enterprise-level applications. In S101, log information receiving device 104 may receive (e.g., collect, process) activity log information from a plurality of monitored endpoints (e.g., users, systems, devices, servers) on network 1 (e.g., process information about processes performed by or activated by each of the plurality of monitored endpoints) over a period of time. After collecting activity log information in S101, map generating device 106 may, in some configurations, for example, generate one or more of an identity (e.g., end-user, system) navigation map and a perspective navigation map in S103 and S105, respectively.

Specifically, in S103, identity navigation map generating device 114 may generate (e.g., determine, create, construct, identify) an identity (e.g., end-user, system) navigation map. The identity navigation graph may be a behavior graph (e.g., a base analysis map, a warehouse of information, both). For example, in some configurations, identity navigation map generating device 114 may generate an aggregated statistical graph (e.g., a navigation map) for each endpoint (e.g., a monitored system, a monitored user). The aggregated statistical graph may represent one or more of a sequence of triggered actions (e.g., sequence of activation) and a sequence of navigation actions (e.g., an order of activities, which activity was performed after what activity). Identity navigation map generating device 114 may accumulate the repeated activities and generate, for example, a histogram of repeated sequences navigation. The aggregated statistical graph may comprise the histogram of repeated sequences navigation in some configurations. Moreover, identity navigation map generating device 114 may analyze and generate graphic information corresponding to durations of pause between particular events (e.g., stochastic events distribution). In some configurations, identity navigation map generating device 114 may generate a system navigation map, rather than or in addition to an end-user navigation map, during S103. Such system navigation maps may be generated, for example, when end-user information is one or more of unavailable, uncollected, and unneeded or when system navigation maps may be more appropriate than or complimentary to end-user navigation maps.

Moreover, in S105, perspective navigation map generating device 116 may generate (e.g., determine, create, construct, identify) a perspective (e.g., a plurality of identities) navigation map. Perspective navigation map generating device 116 may accumulate a plurality of identity navigation maps, or at least the information that would be used to generate the plurality of identity navigation maps, over a period of time, which may potentially reduce statistical bias and measurement noise. For example, the threshold created by statistical bias and measurement noise may define the statistical sensitivity of the system. The resulting combination of identity navigation maps or identity navigation map information may be used to generate a graph that may represent the activities of a plurality of monitored systems, monitored users, or both over time. Such a graph may assist in the identification of composite processes and applications over time and may be provided to other services for further analysis. A repeating sequential activation with the highest statistics (e.g., a greatest frequency) among monitored activations, for example, may suggest a recurring pattern (e.g., a pattern that may be detected by one or more of cluster processes and sorting processes) and may highlight a probable, repeating composite application process (e.g., within a structured system, within an aggregated system of situational applications that an end-user or a system may have created itself). Perspective navigation map generating device 116 may generate one or more perspective maps based on, for example, the mass collection of data (e.g., graphs) and the correlated stochastic timing of the data. Each graph may, for example, correspond to a single dimension of meta-data (e.g., a particular element of the data structure storing the token) that may describe the user or system or a certain tag (e.g., category). For example, such perspective navigation maps may be based on tag information indicating that identities are associated with one or more of organizational roles, departments, band (e.g., rank within an organization), and labor types. Aggregation may be performed in different ways and may appear in different forms. For example, simple aggregation (e.g., counting) may be used as an aggregation process in some configurations. Alternatively or additionally, statistical average (e.g., normalized weighted average) accumulation may be used as an aggregation process. Moreover, one of the navigational perspective maps may be a generic map that may accumulate, for example, all users, without applying a filter.

In some configurations, only one of S103 and S105 may be performed. In other configurations, both S103 and S105 may be performed. Further, in certain configurations, one or more of an IT manager and a management system may determine which of S103 and S105 is to be performed, and the one or more of the IT manager and the management system may determine to generate identity navigation maps based on one or more particular identities. In still other configurations, S103 and S105 may be omitted.

Figure 4:
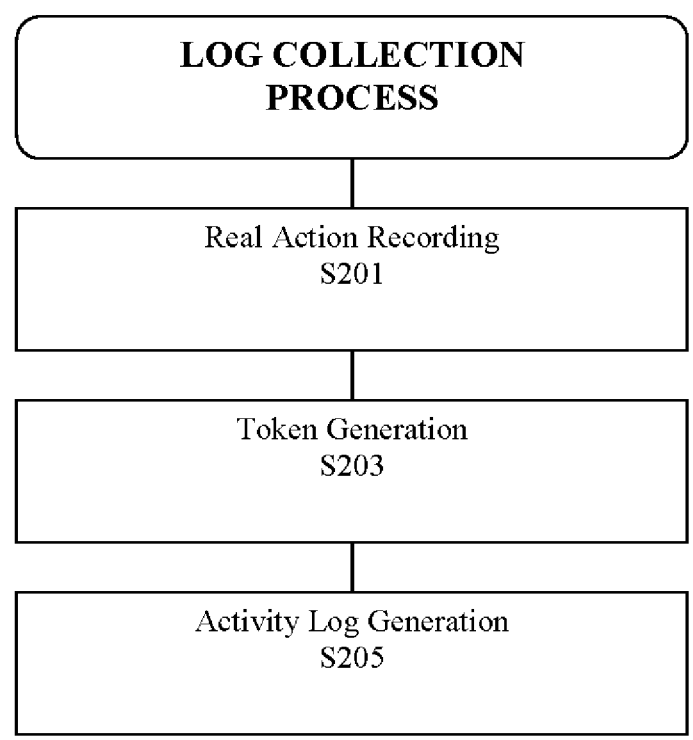
FIG. 4 illustrates a log collection process.

Referring now to FIG. 4, the log collection process of S101 now is disclosed in more detail. In S201, process information receiving device 108 may receive (e.g., collect, record, monitor) information about real actions (e.g., commands, request, processes). In particular, process information receiving device 108 may receive information about an action-triggering event (e.g., URL or http request message, triggered by either humans or machines, to another web site or web service) from one or more identities under investigation. Nevertheless, the detection of actions (e.g., commands and activities) may not be limited to web protocols, such as, for example, http or ftp, but rather may depend on the actual monitoring tool installed. Web monitoring may be performed remotely, without agents, or may require installed technology (e.g., local installations). The receiving may be performed on the end user device or system, whether mobile or fixed, and whether laptop or cellular, and information may be received from, for example, one or more of ports of outgoing activity, network switches, and other locations (e.g., nodes, routers, inbound ports, gateways) on network 1. The information received may, for example, identify one or more of an IP address of the activation, a MAC address of the activation, and other location information about the activation on the network. Further, when more access is permitted to systems that are closer to the end-user (e.g., installing an agent on the monitored machine), process information receiving device 108 may become more accurate (e.g., with the collection of more identity data about users of the monitored machine). For example, process information receiving device 108 may receive process information corresponding to one or more processes performed in the network. Such process information may comprise, for example, identity information identifying an identity that activated each process and activity information identifying a particular function (e.g., process, result, transformation, change) performed by the process.

In S203, which may, for example, be performed subsequent to or concurrently with S201, token determining device 110 may determine (e.g., generate, create, construct, identify) one or more tokens, which may represent one or more portions of the process information received in S201. For example, token determining device 110 may determine an equivalent token (e.g., a codified representation) for each type of activation and target (e.g., triggered navigation request). The token may replace long string-based descriptors and may utilize less storage space and processing power than such long string-based descriptors. The token may, for example, be based on one or more of the monitored system, the sub-domain of the monitored system, and the type of action. For example, a token may be based on and represent a main URL, sub-pages associated with the main URL (e.g., domain space), and codified parameter types or forms, such as the call variables (e.g., http request/get/set). For example, token determining device 110 may maintain and store a codified token representing or associated with an identity that may be generated by CPU 102 or provided by an identity management system. Consequently, the identity may be replaced by a token, which may enable observation of statistics without necessarily divulging real identities. For example, a user identity token may represent the identity of an orchestration entity (e.g., roles, additional descriptive data) that initiated an action. S203 is disclosed in more detail, with reference to FIG. 5, below.

In 5205, which may, for example, be performed subsequent to or concurrently with S203, log determining device 112 may determine (e.g., generate, create, construct, identify) an activity log. In particular, log determining device 112 may replace the process information (e.g., actual request and the activated system identity) with one or more codified token (e.g., a token determined by token determining device 110 in S203). For example, in some considerations, log determining device 112 may determine a combined token indicating "who did what" (e.g., a "who did what" description) along with a timeline (e.g., a "what happened when" description) and an identification of the machine or geographical location from which the request was made (e.g., a "where did it happen" description). In some configurations, for example, such a combined token may represent a plurality of processes performed or activated by a particular identity. In other configurations, for example, such a combined token may represent a particular process. For example, log determining device 112 may determine log information for a particular process that comprises one of more of the tokens determined in S203 (e.g., an activity token, an identity token).

Figure 5:
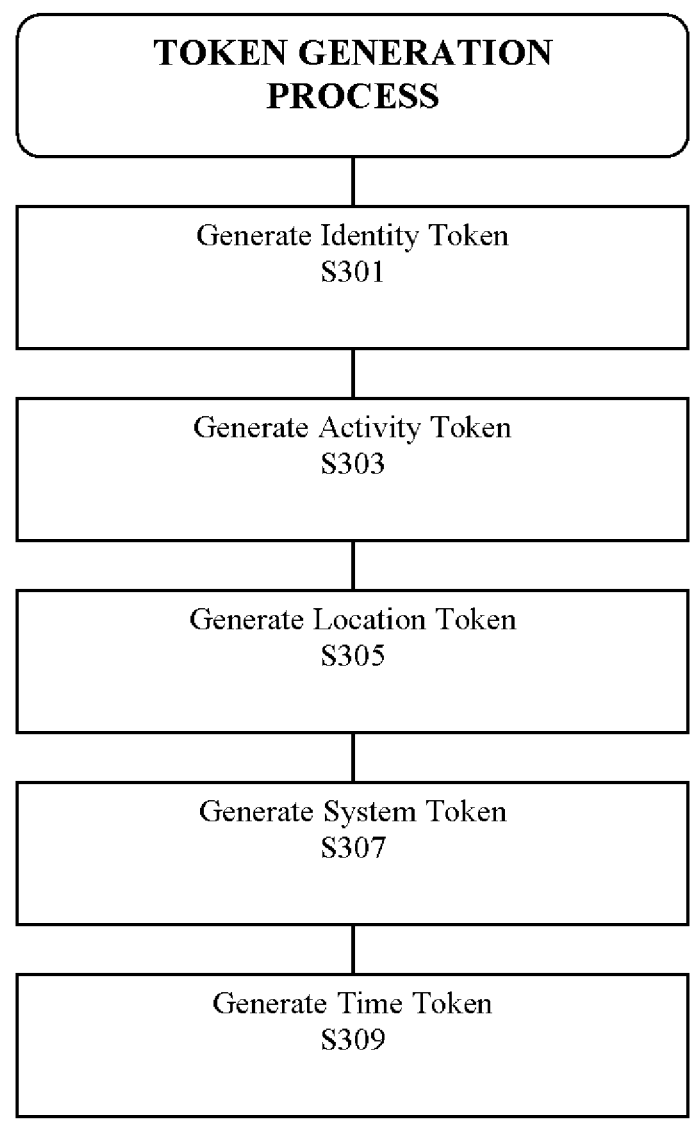
FIG. 5 illustrates a token generation process.

Referring now to FIG. 5, the token generation process of S203 now is disclosed in more detail. The processes performed in the token generation process may be performed in any order. Further, one or more of the processes performed in the token generation process may be performed concurrently with, subsequent to, or prior to one of more of the other processes performed in the token generation process. Moreover, one or more of the processes performed in the token generation process may be omitted. In S301, identity token determining device 118 may determine (e.g., generate, create, construct, identify) an identity token that may represent the identity (e.g., end-user, system) that performed or activated the process on which the process information is based. The identity token may be newly created or may be a particular identity token from a database of existing identity tokens. In S303, activity token determining device 120 may determine (e.g., generate, create, construct, identify) an activity token that may represent the activity or process on which the process information is based or a function thereof. The activity token may be newly created or may be a particular activity token from a database of existing activity tokens. In S305, location token determining device 122 may determine (e.g., generate, create, construct, identify) a location token that may represent the location (e.g., geographic location, network location) where the process on which the process information is based was performed or activated. The location token may be newly created or may be a particular location token from a database of existing location tokens. When the identity token determining device 118 has determined the identity token that represents an end-user, rather than a system, system token determining device 124 may, in S307, determine (e.g., generate, create, construct, identify) a system token that may represent the system that performed or activated the process on which the process information is based. The system token may be newly created or may be a particular system token from a database of existing system tokens. In S309, sequence token determining device 126 may determine (e.g., generate, create, construct, identify) a time or sequence token that may represent the time or sequence in which the process on which the process information is based was performed or activated. The time or sequence token may be newly created or may be a particular time or sequence token from a database of existing time or sequence tokens.

Figure 6:
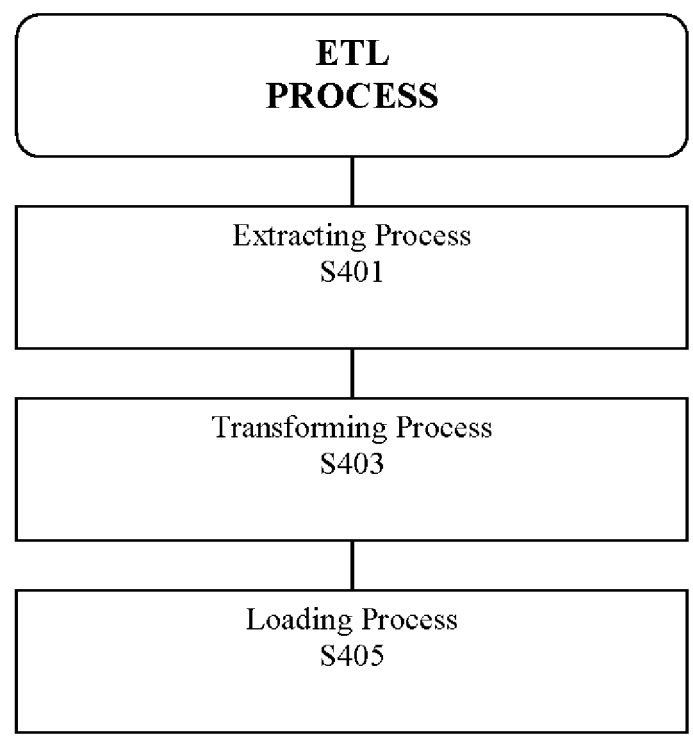
FIG. 6 represents an extract-transform-load ("ETL") process.

Referring now to FIG. 6, an ETL process, which may be an example of a data-warehousing process, now is disclosed. The ETL process may be performed by one or more of the components of CPU 102. In S401, an extracting process may be performed. During the extracting process, CPU 102 may monitor a parameter (e.g., process, identity, time, location, system). Further, CPU 102 may record a value for the parameter and may load the value in a local storage location (e.g., a memory or other storage media, such as memory 101). CPU 102 may load a codified (e.g., changed) value in a data structure that may represent the recorded information (e.g., meta-data) in a lean and efficient manner. Consequently, CPU 102 may create a particular data store that may efficiently be used for trail auditing and compliance analytics.

In S403, a transforming process may be performed. During the transforming process, which may be performed on a centralized system (e.g., system 100), CPU 102 may gradually transform recorded meta-data information into statistical graph structures that may capture different process nodes. Consequently, CPU 102 may create a certain data store (e.g., an aggregated, raw warehouse of data) that may be used for root-cause analytics.

In S405, a loading process may be performed. During the loading process, CPU 102 may create one or more different perspectives, based on analytical views that may be selected by an IT manager or management system, for a collection of users and systems. Consequently, CPU 102 may create a further data store that may be used for enterprise analytics.

Accordingly, the ETL process applied to situational applications may, for example, discover active processes and may map the connectivity (e.g., orchestration actions) of such processes into a common data structure, which may, for example, be uniquely structured as the process DNA.

Figure 7:
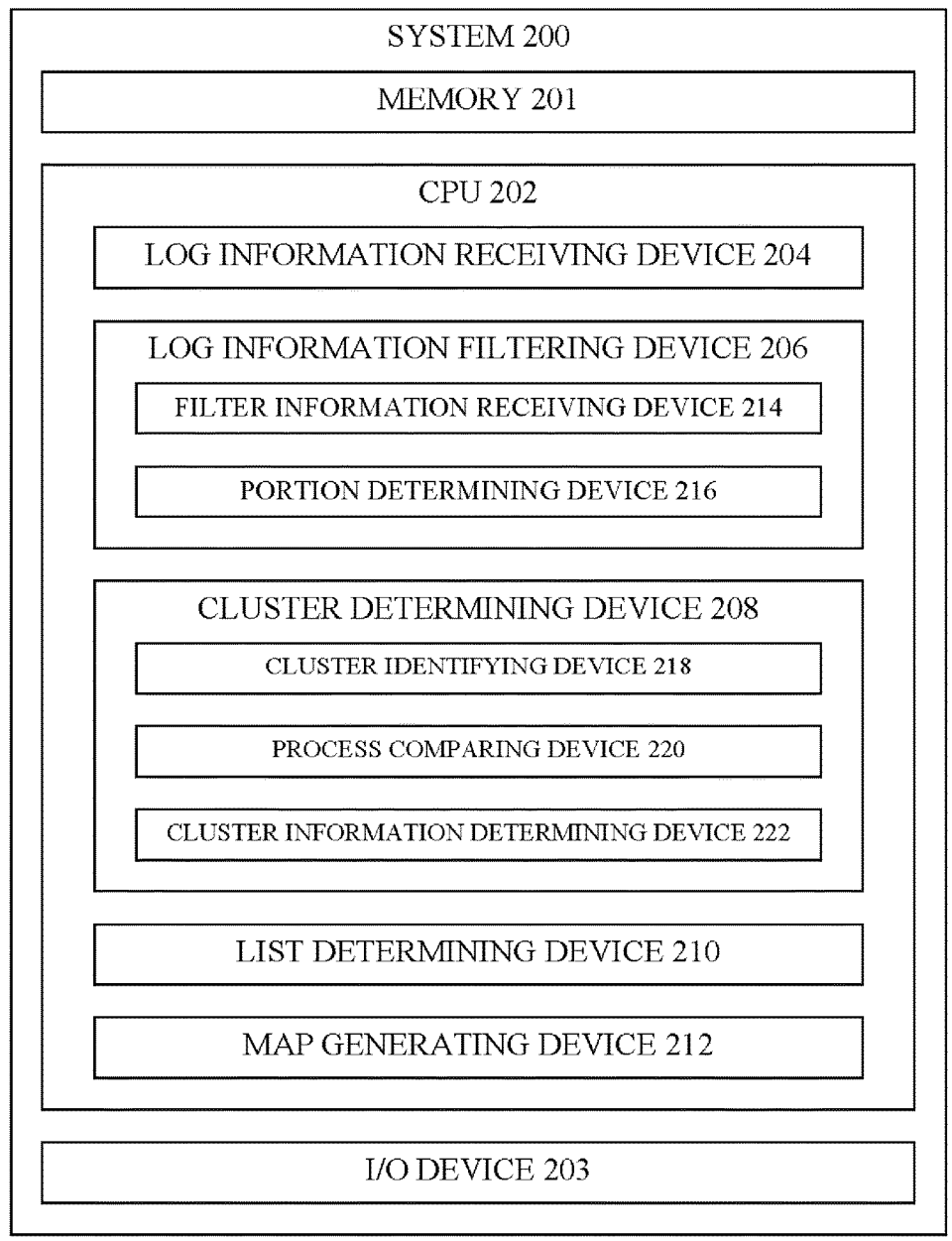
FIG. 7 is a schematic representation of a system configured to analyze and discover situational and complex applications.

Referring now to FIG. 7, system 200, which may analyze process data and discover situational and complex applications, now is disclosed. System 200 may comprise a memory 201, a CPU 202, and an input and output ("I/O") device 203. Memory 201 may be substantially similar to or the same as memory 101 described above and may store computer-readable instructions that may instruct system 200 to perform certain processes. In particular, when executed by CPU 202, which may be substantially similar to or the same as CPU 102 described above, the computer-readable instructions stored in memory 201 may instruct CPU 202 to operate as one or more of a log information receiving device 204, a log information filtering device 206, a cluster determining device 208, a list determining device 210, and a map generating device 212. More specifically, for example, CPU 202 may operate as one or more of a filter information receiving device 214 and a portion determining device 216 when the computer-readable instructions stored in memory 201 instruct CPU 202 to operate as log information filtering device 206. Further, for example, when executed by CPU 202, the computer-readable instructions stored in memory 201 may instruct CPU 202 to operate as one or more of a cluster identifying device 218, a process comparing device 220, and a cluster information determining device 222 when the computer-readable instructions stored in memory 201 instruct CPU 202 to operate as cluster determining device 208. In some configurations, log information receiving device 204 and map generating device 212 may perform functions substantially similar to or the same as functions performed by log information receiving device 104 and map generating device 106, respectively, as described above.

In some configurations, one or more of devices 204 through 212 may be implemented on different CPUs. In some configurations, system 200 may not comprise one or more of devices 204 through 212. I/O device 203 may be substantially similar to or the same as I/O device 103 described above and may transmit data to cloud 2, may transmit data to other devices connected to system 200, and may transmit a notification (e.g., display a message, make a sound, send an email, make a telephone call) or other information (e.g., end-user navigation map, end-system navigation map, perspective navigation map) to a network manager, a management system, or other entity. In some configurations, the notification or other information may be displayed on a display (not depicted) for analysis by a user. Further, I/O device 203 may implement one or more of wireless and wired communication between system 100 and other devices.

Figure 8:
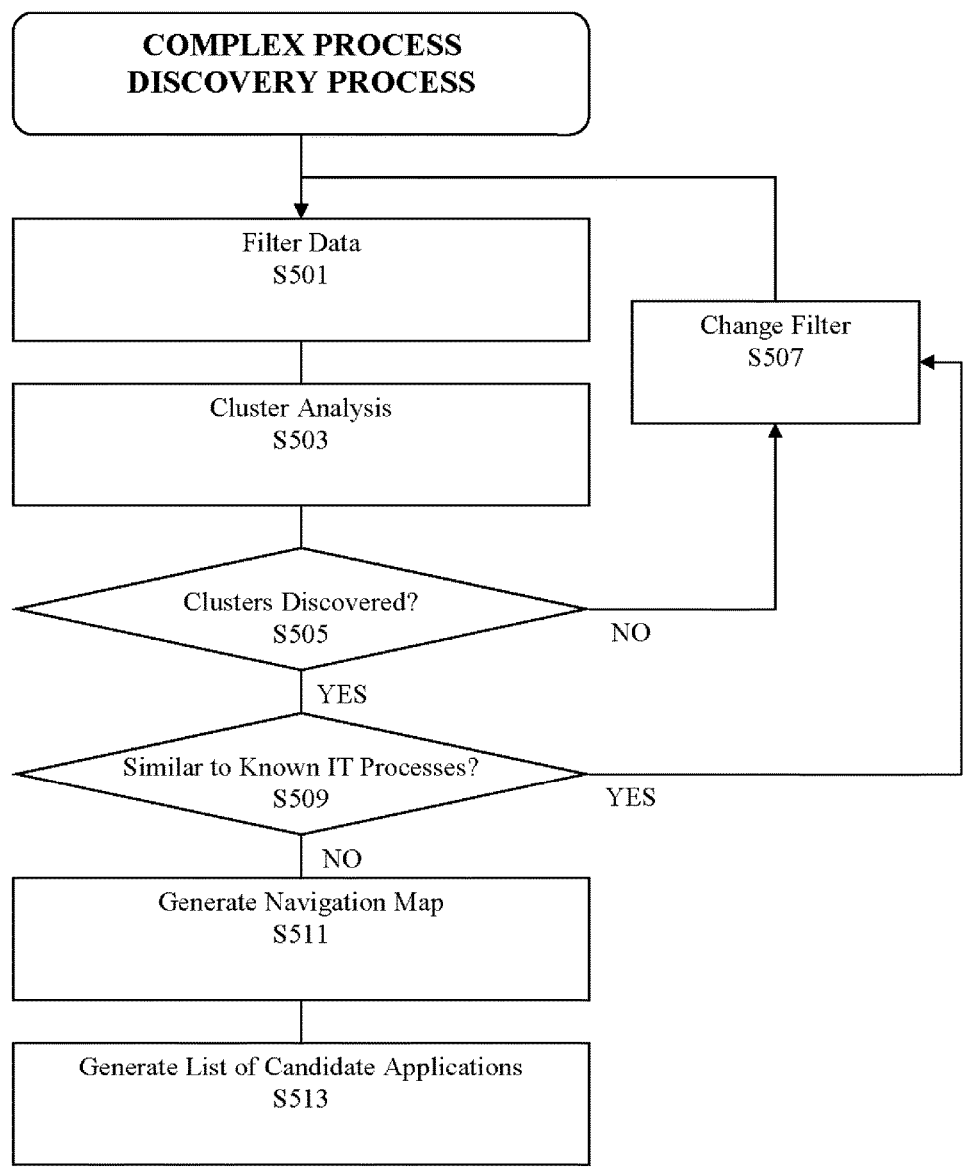
FIG. 8 illustrates a complex process discovery process.

Referring now to FIG. 8, a complex process discovery process, in which system 200 may analyze process information (e.g., log information received via log information receiving device 204) and discover or identify situational and complex applications operating within network 1, now is disclosed. In particular configurations, log information receiving device 204 may receive log information in a manner substantially similar to or the same as log information receiving device 104 described above. In other configurations, log information receiving device 204 may receive log information from a database or another device, such as system 100, that has already been collected by a system, such as system 100, in the manner described above.

In S501, log information filtering device 206 may filter the log information received via log information receiving device 204, such that statistical noise in the data may be reduced and the log information may be more easily (e.g., less computational power required) and more accurately analyzed. For example, filter information receiving device 214 may receive filter information (e.g., through a user input, from another system, from a filtering application, from memory 201) for filtering the log information. The filter information may be associated with a particular one of the tokens (e.g., codified parameters) in the log information (e.g., an identity token, an activity token, a system token, a sequence token, location token) and may identify which portions of the log information to filter out for further processing. For example, based on the filter information, the portion determining device may determine a particular portion of the log data for further analysis that comprises log data corresponding to one or more of processes performed or activated on a particular date, at a particular time, or within a particular period (e.g., on Tuesdays, between 9 AM and 11 AM); processes performed or activated by a particular user, users having a particular role (e.g., all salesmen, all managers, all scientists), or a particular group of users (e.g., all members of the accounting department); processes performed or activated by users or systems in certain locations (e.g., at a particular campus, in the U.S., in California); processes performed or activated by particular systems or groups of systems (e.g., routers, laptops, tablets, smartphones); and other processes of interest. Moreover, log information filtering device 206 may, for example, partially select statistical nodes and activities (e.g., average over different time windows) according to a prioritization order (e.g., ranges of statistical counts, over different periodical time spans). By filtering the data, log information filtering device 206 may simplify the log information, which may reduce noise and assist cluster determining device 208 in identifying complex and situational applications (described below).

In some configurations, for example, S501 may be omitted. In such configurations, for example, log information receiving device 204 may perform a de facto filtering process by collecting log information with certain characteristics (e.g., only collecting information about processes activated or performed by selected devices on network 1, only collecting information about processes activated or performed by selected users or users with specific roles, only collecting information about processes activated or performed at certain times or on certain dates, collecting reduced information about processes activated or performed within network 1). Consequently, by limiting the log information collected by log information receiving device 204, a de facto filtering process may be accomplished, and there may be limited utility in performing additional filtering. Therefore, in such configurations, for example, S501 may be omitted.

In S503, cluster determining device 208 may determine if clusters of processes are identified in the portion of the log information filtered out by the log information filtering device 206. If S501 is omitted, cluster determining device 208 may determine if clusters of processes are identified in the log information without filtering the log information beforehand. A cluster of processes may comprise, for example, a plurality of processes performed or activated in a particular sequence (e.g., process B occurs before process C but after process A). For example, a cluster may comprise a process A (e.g., an authentication request process), a process B (e.g., a response receiving process) that may be performed after and in response to process A, and a process C (e.g., a document display process) that may be performed after and in response to process B. Such a cluster of processes may be referred to as cluster ABC, for example.

Nevertheless, cluster determining device 208 may not determine that a cluster exists when particular processes occur in a particular sequence only one time in network 1. In particular, if only one occurrence of processes in the particular sequence occurs, the sequence may be random or merely the result of other clusters of processes interacting. Thus, cluster determining device 208 may determine that a cluster of processes exists when a particular group of processes are activated or performed in a particular sequence at least a predetermined number of times (e.g., more than once, at least twice, five times, one hundred times). In some configurations, cluster determining device 208 may only determine that a cluster of processes exists when the particular processes have been performed in the particular sequence with a particular frequency (e.g., every Tuesday, everyday at 9 AM, every 12th day of the month).

In S503 in some configurations, cluster determining device 208 may function as a navigational regional cluster ("NAVROC") detector. The NAVROC detector may be applied to a plurality of types of maps (e.g., end user maps, perspective maps, universal maps) or even applied directly to the log information used to construct such maps, and the NAVROC detector may perform cluster or similar grouping techniques that may show areas (e.g., navigation nodes and directions on a graph) in which a high activity path (e.g., a large number of activations) may be detected. Specifically, the NAVROC detector may determine that clusters of processes exist (e.g., detect the clusters of processes) at areas where a large number of sequential activations of processes occur (e.g., an area at which most of the sequential activations occur). The detected areas may be grouped according to one or more of end-user tagging and system tagging (e.g., identified roles, identified origin). The detected areas may even be compared between different types of maps or log information. Such comparisons and groupings may assist in the process of detecting activity structures (e.g., clusters). Such detected clusters of navigation activities and actions may be a community based on navigation activity and may be referred to as "navigational regional clusters." The size of a NAVROC (e.g., number of navigation nodes, statistics) may determine the probability of correctly detecting an activity (e.g., the larger the NAVROC and the more frequently the NAVROC is activated in the network, the more likely a new application has been discovered). S503 is described in more detail below, with reference to FIG. 9.

In S505, CPU 202 may determine whether a cluster of processes was identified (e.g., in S503) in the log information or the portion of log information filtered out by log information filtering device 206. If a cluster of processes was identified (S505: YES), the process may proceed to S509 or S511 if S509 is omitted. If a cluster of processes was not identified (S505: NO), the process may proceed to S507. In S507, CPU 202 may change the filter settings of log information filtering device 206 to change (e.g., expand the log information to be analyzed, focus the log information to remove additional noise) the portion of log information filtered out in S501, such that cluster determining device 208 may be better able to identify or detect clusters of processes. In some configurations, in S507, CPU 201 may generate a request for a user or another device to provide a new filter setting to be received by filter information receiving device 214. Subsequent to changing the filter settings of log information filtering device 206 in S507, the process may proceed to S501 and perform a new filtering process.

In certain configurations, S501 may not be initially performed prior to S503, but may be performed only after a negative determination is made in S505 (S505: NO). In such configurations, S507 may be omitted at least the first time S501 is to be performed. In some configurations, if a cluster of processes was not identified (S505: NO), the process may pause until a predetermined amount of additional log information is received and subsequently return to S503. In this manner, enough additional log information may be accumulated to improve the likelihood that cluster determining device 208 may detect or identify a cluster of processes.

In S509, process comparing device 220 may compare an identified cluster of processes with, for example, a database of manager-known processes or applications. Manager-known processes and applications may be complex applications and processes operating or being activated within network 1 of which an IT manager or management system is already aware (e.g., enterprise-level applications, situational applications known to the IT manager or management system). In certain configurations, for example, if process comparing device 220 determines that the identified cluster of processes corresponds to a manager-known process (S509: YES), the process may proceed to S507. If process comparing device 220 determines that the identified cluster of processes does not correspond to a manager-known process, the process may proceed to S511 or S513. Thus, the S501 and S503 may be repeated until a process that is not a manager-known process is detected. In this manner, the complex discovery process of FIG. 8 may detect situational applications operating or being activated on network 1 that are unknown to IT managers and management systems.

In some configurations, S509 may be omitted and a comparison with manager-known processes may not be performed. In other configurations, the process may proceed to S511 or S513 regardless of whether the identified cluster of processes corresponds to a manager-known process or application. In such configurations, process comparing device 220 may determine whether the identified cluster of processes corresponds to a manager-known process or application and generate identification information for the identified cluster of processes based on a result of the determination. For example, if the cluster of processes corresponds to a particular known process, process comparing device 220 may generate identification for the cluster of processes identifying the cluster of processes as the particular known process. Moreover, if the cluster of processes does not correspond to any manager-known process, process comparing device 220 may generate identification for the cluster of processes identifying the cluster of processes as a newly discovered process. In some configurations, process comparing device 220 may even determine whether the cluster of processes is a mutated version (e.g., an upgrade, a modification, a virus-infected version) of the particular process or application and may generate identification for the cluster of processes identifying the cluster of processes as a mutated version of the particular known process. In some configurations, process comparing device 220 may compare the cluster of processes with a database or list of processes that comprises manager-known processes as well as other processes. In such configurations, process comparing device 220 may provide additional information for newly discovered processes, such as the name of a situational application that implements the newly discovered process.

In some configurations, for example, process comparing device 220 may compare the detected clusters (e.g., harvested patterns) with existing, known modeled processes. Thus, in some configurations, for example, the system may classify whether a cluster comprises a previously-unknown (e.g., unknown to IT managers or business managers, new) process or application or an existing process or application. Moreover, in some configurations, for example, the system may determine a level of similarity (e.g., mutation) between the detected clusters and the known processes. In some configurations, the level of similarity may be used to determine whether an application or process is unknown or known.

In S511, map generating device 212 may generate a navigational map (e.g., a navigational map similar to the identity navigation maps and perspective navigation maps described above). In certain configurations, map generating device 212 may isolate the log information corresponding to the cluster of processes and generate a navigation map comprising only the log information associated with the cluster of processes. In this manner, an IT manager may be able to better view and study the interactions within the cluster of processes. In other configurations, map generating device 212 may generate the navigation map with log information corresponding to other processes as well as the cluster of processes. In such configurations, for example, map generating device 212 may highlight the cluster of processes. In some configurations, S511 may be omitted. In particular configurations, an IT manager may be provided with an option to select whether a navigation map identifying the cluster of processes is desired.

In S513, list determining device 210 may determine a list comprising information identifying a candidate application (e.g., an application that instructs one or more devices to perform the processes of the cluster of processes) based on the identified cluster of processes. In particular, if the cluster of processes is determined to be a newly discovered complex process, for example, the information may identify the candidate application by identifying the processes of the cluster of processes. If the cluster of processes is determined to be a manager-known process, for example, the list may identify the candidate application using the name of the particular manager-known process to which the cluster of process corresponds. Further, the list may comprise statistics and other information (e.g., number of activations, location of activations, identities of activators) about the candidate application corresponding to the cluster of processes.

In some configurations, the list may comprise information about a plurality of candidate applications representing a plurality of clusters of processes identified by cluster determining device 208. Each candidate application of the plurality of candidate applications may represent a particular cluster of the plurality of clusters of processes. In such configurations, the plurality of candidate applications may correspond to one or more of, for example, the most-activated clusters of processes (e.g., the 5 most-activated clusters); the least-activated clusters of processes (e.g., the 3 least-activated clusters); clusters of processes activated in a certain location, by a certain identity, or within a certain time period; clusters of processes having been activated at least a predetermined number of times (e.g., clusters of processes activated at least 100 times); clusters of processes having been activated fewer than a predetermined number of times (e.g., clusters of processes activated at least twice but fewer than 5 times); and other predetermined groups of clusters of processes. In this manner, IT managers or management systems may determine which types of candidate situational applications to discover and analyze (e.g., popular applications, unpopular applications). Accordingly, IT managers or management systems may use information about newly discovered situational applications and complex processes to determine how best to utilize network resources (e.g., perform triage).

In some configurations, log information associated with one or more candidate application may be codified to represent the candidate application (e.g., token information representing the candidate application may be generated). Such codified information about the candidate application may be used to generate a navigation map in S511, which may be performed subsequent to S513 in some configurations.

Figure 9:
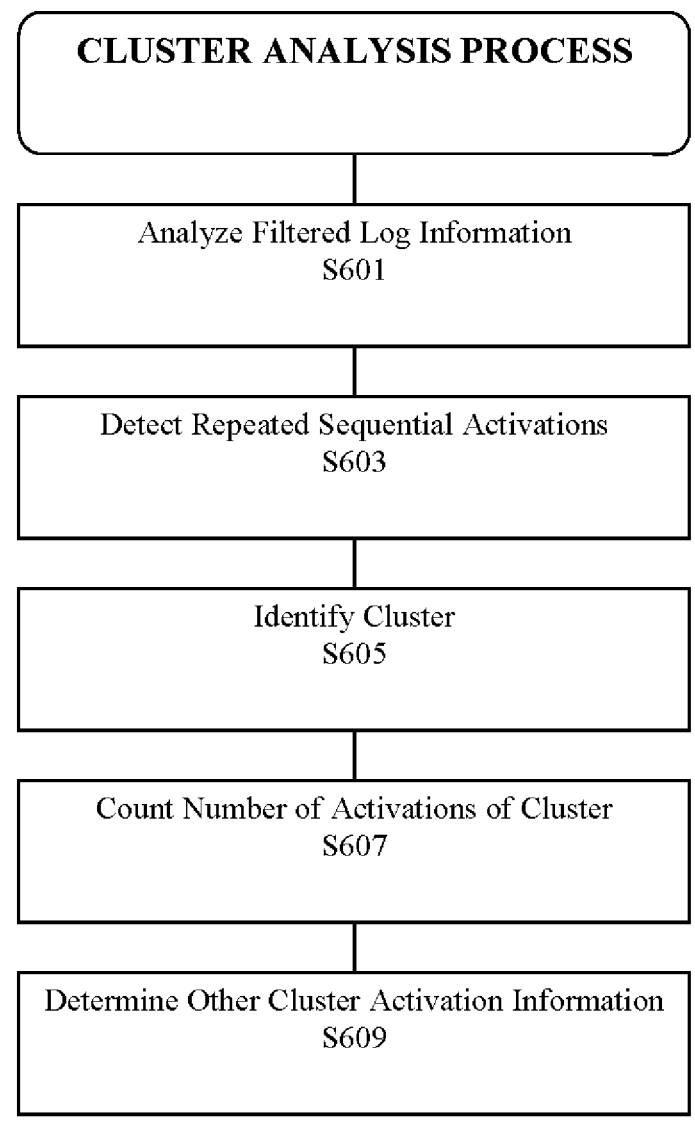
FIG. 9 illustrates a cluster analysis process.

Referring now to FIG. 9, cluster analysis process S503 now is disclosed in more detail. Specifically, in S601, cluster determining device 208 may receive the filtered or unfiltered log information, and cluster identifying device 218 may initiate a process of analyzing the log information. Such analysis may comprise one or more statistical analysis routines, in which a number of activations for each process described by the log information may be determined, probable sequences of the processes described by the log information are determined, and other information that may identify a plurality of activations of particular processes in particular sequences may be determined. In S603, cluster identifying device 218 may identify repeated sequential activations of processes (e.g., processes repeated in a particular sequence at least twice). Specifically, cluster identifying device 218 may determine that certain processes occur in particular patterns (e.g., sequences) based on repetitive occurrences of such patterns. In some configurations, if the log information is highly detailed, cluster identifying device 218 may utilize the log information to identify particular processes are activated in response to other processes, and cluster identifying device 218 may determine a particular pattern based on such information.

In S605, cluster identifying device 218 may identify a plurality of processes activated in a particular sequence as a cluster of processes in response to detecting repeated sequential activations of the plurality of processes in S603. Consequently, S605 may be a process of identifying a particular cluster of processes. In S607, cluster information determining device 222 may count a number of activations of the cluster of processes within network 1 or within a predetermined portion of network 1. Thus, cluster information determining device 222 may determine whether the cluster of processes is a high-activity cluster (e.g., whether an application implementing the cluster of processes is highly used by identities within network 1). Further, in S609, cluster information determining device 222 may determine further information about activations of the cluster of processes. In particular, cluster information determining device 222 may determine, for example, information about one or more of locations within network 1 where the cluster of processes was activated or performed, identities (e.g., user or system) that activated or performed the cluster of processes, lengths of time required to perform or activate the cluster of processes, times or dates when the cluster of processes were activated or performed, other clusters of processes performed or activated in association with the clusters of processes, and other characteristics related to activation or performance of the cluster of processes. Such information may be used by list determining device 210 when determining information about the candidate application (e.g., the cluster of processes) to provide in the list of candidate applications. In some configurations, process comparing device 220 also may determine other cluster activation information in S609 by comparing the cluster of processes to manager-known applications or some other database of applications and identifying whether the cluster of processes represents a newly discovered application, a known or manager-known application, or a mutation of a known or manager-known application. Such information also may be used by list determining device 210 to provide further information about the candidate application representing the cluster of processes. The cluster analysis process of FIG. 9 may be performed repetitively to determine a number of different clusters of processes and representative candidate applications.

In some configurations, cluster analysis may be used to gather further information about manager-known situational applications being operated or activated within network 1. In such cases, an IT manager or management system may identify a particular situational system and may instruct cluster determining device 208 to obtain statistics and other information (e.g., number of activations, location of activations, identities of activators) about activations of the situational application. List determining device 210 may generate this information for the IT manager or management system. In such configurations, the IT manager or management system may utilize system 200 to monitor and manage known situational applications rather than merely discovering new situational applications and complex processes.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   receiving, using a processor, process data corresponding to a plurality of processes controlled by a plurality of applications operating in a network, the process data comprising:
   identity data identifying each identity that activated one or more applications of the plurality of applications; and
   activity data identifying each process of the plurality of processes controlled by each application of the plurality of applications;
   obtaining, using the processor, an identity token for each identity identified in the identity data, wherein each identity token is a codified representation of an identity that activated one or more applications of the plurality of applications, and wherein each identity token is different from the identity data;
   obtaining, using the processor, an activity token for each process of the plurality of processes identified in the activity data, wherein each activity token is a codified representation of a process of the plurality of processes controlled by one or more applications of the plurality of applications, and wherein each activity token is different from the activity data;
   obtaining, using the processor, a combined token for each respective application of the plurality of applications, wherein the combined token includes each identity token representing an identity that activated the respective application and each activity token representing a process controlled by the respective application; and
   providing, using the processor, an identity navigation map for a particular identity, wherein the identity navigation map incorporates each combined token that includes an identity token representing the particular identity to graphically represent on a visual display each process of the plurality of processes controlled by each application of the plurality of applications that was activated by the particular identity.

2. The method of claim 1,
   wherein the identity navigation map graphically represents each process of the plurality of processes controlled by each application of the plurality of applications that was activated by the particular identity arranged according to an order of activation of each process.

3. The method of claim 1,
   wherein the identity navigation map comprises an aggregated statistical graph representing each process of the plurality of processes controlled by each application of the plurality of applications that was activated by the particular identity arranged according to a sequence of activations of each process.

4. The method of claim 1, further comprising:
   providing a plurality of identity navigation maps for a plurality of identities, including the particular identity, together to graphically represent each process of the plurality of processes controlled by each application of the plurality of applications that was activated by one or more identity of the plurality of identities.

5. The method of claim 1, further comprising:
   providing, using the processor, a histogram using each combined token for each respective application of the plurality of applications, the histogram comprising:
   count data indicating a number of repetitions of a sequence of activations of each process controlled by the plurality of applications.

6. The method of claim 1, further comprising:
   providing, using the processor, a perspective navigation map using each combined token for particular applications of the plurality of applications, the perspective navigation map comprising:
   an aggregated statistical graph representing a plurality of activity tokens arranged according to a sequence of activations of each process of the plurality of processes controlled by each application of the particular applications that was activated by one or more of a plurality of identities, wherein the particular applications are applications activated by identities from among the plurality identities.

7. The method of claim 6,
wherein each activity token of the plurality of activity tokens is included in one or more of a plurality of combined tokens, and
wherein each combined token of the plurality of combined token also comprises an identity token including tag data identifying a same business department.

8. A processor system comprising:
a processor and a non-transitory computer readable storage medium having computer readable program code embodied therewith, wherein the computer readable program code implements a plurality of devices when executed by the processor and the plurality of devices comprise:
  a process information receiving device configured to receive process data corresponding to a plurality of processes controlled by a plurality of applications operating in a network, the particular process data comprising:
    identity data identifying each identity that activated one or more applications of the plurality of applications; and
    activity data identifying each process of the plurality of processes controlled by each application of the plurality of applications;
  an identity token determining device configured to obtain an identity token for each identity identified in the identity data, wherein each identity token is a codified representation of an identity that activated one or more applications of the plurality of applications, and wherein each identity token is different from the identity data;
  an activity token determining device configured to obtain an activity token for each process of the plurality of processes identified in the activity data, wherein each activity token is a codified representation of a process of the plurality of processes controlled by one or more applications of the plurality of applications, and wherein each activity token is different from the activity data;
  a token determining device of the processor system configured to obtain a combined token for each respective application of the plurality of applications, wherein the combined token includes each identity token representing an identity that activated the respective application and each activity token representing a process controlled by the respective application; and
  an identity navigation map generating device configured to provide an identity navigation map for a particular identity, wherein the identity navigation map incorporates each combined token that includes an identity token representing the particular identity to graphically represent on a visual display each process of the plurality of processes controlled by each application of the plurality of applications that was activated by the particular identity.

9. The system according to claim 8,
wherein the identity navigation map graphically represents each process of the plurality of processes controlled by each application of the plurality of applications that was activated by the particular identity arranged according to an order of activation of each process.

10. The system according to claim 8,
wherein the identity navigation map comprises an aggregated statistical graph representing each process of the plurality of processes controlled by each application of the plurality of applications that was activated by the particular identity arranged according to a sequence of activations of each process.

11. The system according to claim 8,
wherein the identity navigation map generating device is further configured to provide a plurality of identity navigation maps for a plurality of identities, including the particular identity, together to graphically represent each process of the plurality of processes controlled by each application of the plurality of applications that was activated by one or more identity of the plurality of identities.

12. The system according to claim 8,
wherein the identity navigation map generating device is further configured to provide a histogram using each combined token for each respective application of the plurality of applications, the histogram comprising:
  count data indicating a number of repetitions of a sequence of activations of each process controlled by the plurality of applications.

13. The system according to claim 8,
wherein the identity navigation map generating device is further configured to provide a perspective navigation map using each combined token for each respective application of the plurality of applications, the perspective navigation map comprising:
  an aggregated statistical graph representing a plurality of activity tokens arranged according to a sequence of activations of each process of the plurality of processes controlled by each application of the plurality of applications that was activated by one or more of a plurality of identities, wherein the plurality of activity tokens include activity tokens representing processes controlled by applications activated by different identities from among the plurality identities.

14. The system of claim 13,
wherein each activity token of the plurality of activity tokens is included in one or more of a plurality of combined tokens, and
wherein each combined token of the plurality of combined token also comprises an identity token including tag data identifying a same business department.

15. A non-transitory computer program product comprising:
a non-transitory computer readable storage medium having computer readable program code embodied therewith, the computer readable program code comprising:
  computer readable program code configured to receive process data corresponding to a plurality of processes controlled by a plurality of applications operating in a network, the particular process data comprising:
    identity data identifying each identity that activated one or more applications of the plurality of applications; and
    activity data identifying each process of the plurality of processes controlled by each application of the plurality of applications;

computer readable program code configured to obtain an identity token for each identity identified in the identity data, wherein each identity token is a codified representation of an identity that activated one or more applications of the plurality of applications, and wherein each identity token is different from the identity data;

computer readable program code configured to obtain an activity token for each process of the plurality of processes identified in the activity data, wherein each activity token is a codified representation of a process of the plurality of processes controlled by one or more applications of the plurality of applications, and wherein each activity token is different from the activity data;

computer readable program code configured to obtain a combined token for each respective application of the plurality of applications, wherein the combined token includes each identity token representing an identity that activated the respective application and each activity token representing a process controlled by the respective application; and computer readable program code configured to provide an identity navigation map for a particular identity, wherein the identity navigation map incorporates each combined token that includes an identity token representing the particular identity to graphically represent on a visual display each process of the plurality of processes controlled by each application of the plurality of applications that was activated by the particular identity.

16. The non-transitory computer program product according to claim 15,
wherein the identity navigation map graphically represents each process of the plurality of processes controlled by each application of the plurality of applications that was activated by the particular identity arranged according to an order of activation of each process.

17. The non-transitory computer program product according to claim 15,
wherein the identity navigation map comprises an aggregated statistical graph representing each process of the plurality of processes controlled by each application of the plurality of applications that was activated by the particular identity arranged according to a sequence of activations of each process.

18. The non-transitory computer program product according to claim 15, wherein the computer readable program code embodied therewith the non-transitory computer readable storage medium further comprises:
computer readable program code configured to provide a plurality of identity navigation maps for a plurality of identities, including the particular identity, together to graphically represent each process of the plurality of processes controlled by each application of the plurality of applications that was activated by one or more identity of the plurality of identities.

19. The non-transitory computer program product according to claim 15, wherein the computer readable program code embodied therewith the non-transitory computer readable storage medium further comprises:
computer readable program code configured to provide a histogram using each combined token for each respective application of the plurality of applications, the histogram comprising:
count data indicating a number of repetitions of a sequence of activations of each process controlled by the plurality of applications.

20. The non-transitory computer program product according to claim 15, wherein the computer readable program code embodied therewith the non-transitory computer readable storage medium further comprises:
computer readable program code configured to provide a perspective navigation map using each combined token for particular applications of the plurality of applications, the perspective navigation map comprising:
an aggregated statistical graph representing a plurality of activity tokens arranged according to a sequence of activations of each process of the plurality of processes controlled by each application of the particular applications that was activated by one or more of a plurality of identities, wherein the particular applications are applications activated by identities from among the plurality identities.

21. The non-transitory computer program product according to claim 20,
wherein each activity token of the plurality of activity tokens is included in one or more of a plurality of combined tokens, and
wherein each combined token of the plurality of combined token also comprises an identity token including tag data identifying a same business department.

\* \* \* \* \*